(12) United States Patent
Yu et al.

(10) Patent No.: US 12,328,190 B2
(45) Date of Patent: Jun. 10, 2025

(54) DATA TRANSMISSION METHOD AND DEVICE

(71) Applicant: Huawei Technologies Co., Ltd., Shenzhen (CN)

(72) Inventors: Zheng Yu, Beijing (CN); Wenping Bi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 853 days.

(21) Appl. No.: 17/487,995

(22) Filed: Sep. 28, 2021

(65) Prior Publication Data

US 2022/0021487 A1 Jan. 20, 2022

Related U.S. Application Data

(63) Continuation of application No. PCT/CN2019/080668, filed on Mar. 29, 2019.

(51) Int. Cl.
*H04L 1/1812* (2023.01)

(52) U.S. Cl.
CPC .................. *H04L 1/1812* (2013.01)

(58) Field of Classification Search
CPC ... H04L 1/1812; H04L 1/1864; H04L 1/1867; H04L 1/1887; H04L 1/1896
See application file for complete search history.

(56) References Cited

U.S. PATENT DOCUMENTS

| 2018/0317213 | A1 | 11/2018 | Islam et al. | |
| 2019/0159191 | A1* | 5/2019 | Kim | H04W 72/04 |
| 2019/0246421 | A1* | 8/2019 | Zhou | H04L 5/00 |

FOREIGN PATENT DOCUMENTS

| CN | 107682128 A | 2/2018 |
| CN | 108282864 A | 7/2018 |

OTHER PUBLICATIONS

Sierra Wireless, "LTE-M Multiple Transport Block Grant Design Considerations," 3GPP TSG RAN WG1 Meeting #96, Athens, Greece, R1-1901630, total 13 pages, 3rd Generation Partnership Project, Valbonne, France (Feb. 25-Mar. 3, 2019).

(Continued)

*Primary Examiner* — Fred A Casca
(74) *Attorney, Agent, or Firm* — Leydig, Voit & Mayer, Ltd.

(57) ABSTRACT

In a data transmission method, a first communications device receives flag information. When the flag information indicates that one piece of control information can be used for scheduling of a plurality of transport blocks, the first communications device obtains transport block allocation information that indicates the number of transport blocks scheduled by the control information and a bit state corresponding to each transport block. Alternatively, when the flag information indicates that one piece of control information can be used for scheduling of only one transport block, the first communications device obtains hybrid automatic repeat request (HARQ) process number information, where the HARQ process number information indicates an HARQ process number corresponding to the transport block scheduled by the control information. The first communications device sends data or receives data based on the information.

10 Claims, 11 Drawing Sheets

(56) References Cited

OTHER PUBLICATIONS

Ericsson, "Feature lead summary for Scheduling of multiple DL/UL transport blocks for LTE-MTC," 3GPP TSG-RAN WG1 Meeting #96, Athens, Greece, R1-1903245, total 15 pages, 3rd Generation Partnership Project, Valbonne, France (Feb. 25-Mar. 1, 2019).
ZTE, "Summary on Multiple TB scheduling enhancement for Nb-IoT," 3GPP TSG RAN WG1 Meeting #96, Athens, Greece, R1-1903257, total 14 pages, 3rd Generation Partnership Project, Valbonne, France (Feb. 25-Mar. 1, 2019).
Huawei, HiSilicon, "Scheduling of multiple transport blocks," 3GPP TSG RAN WG1 Meeting #96, Athens, Greece, R1-1901510, total 8 pages, 3rd Generation Partnership Project, Valbonne, France (Feb. 25-Mar. 1, 2019).
Samsung, "Scheduling of multiple transport blocks for MTC," 3GPP TSG RAN WG1 Meeting #96, Athens, Greece, R1-1902211, total 6 pages, 3rd Generation Partnership Project, Valbonne, France (Feb. 25-Mar. 1, 2019).

\* cited by examiner

DATA TRANSMISSION METHOD AND DEVICE

CROSS-REFERENCE TO RELATED APPLICATIONS

This application is a continuation of International Application No. PCT/CN2019/080668, filed on Mar. 29, 2019, the disclosure of which is hereby incorporated by reference in its entirety.

TECHNICAL FIELD

Embodiments of this application relate to the communications field, and in particular, to a data transmission method and a device.

BACKGROUND

In a communications system, one piece of control information (CI) is usually used to schedule one transport block (TB). A data channel may be a physical downlink data channel or a physical uplink data channel.

To reduce CI transmission overheads and save transmission resources, one CI may be used to schedule a plurality of data channels, or one CI may be used to schedule a plurality of transport blocks.

When one CI is used to schedule a plurality of transport blocks, the CI needs to indicate the number of scheduled transport blocks and indicate whether each transport block is successfully received. For example, when one CI is used to schedule eight transport blocks, the CI needs eight bits to indicate, in a bitmap manner, the number of scheduled transport blocks, and eight bits to indicate, in a bitmap manner, whether each transport block is successfully received. In this way, indication overheads of a maximum of 16 bits (8+8=16 bits) are required.

It can be learned that, in the prior art, when one CI is used to schedule a plurality of transport blocks, more information needs to be indicated by the CI, and therefore, greater indication overheads are required.

In the prior art, bit overheads for scheduling a transport block by using CI are excessively high. Especially, considering high-reliability control channel performance, higher bit overheads consume more transmission resources. How to reduce indication overheads for scheduling a transport block by using CI still needs to be resolved.

SUMMARY

Embodiments of this application provide a data transmission method and a device, to reduce indication overheads for scheduling a transport block by using CI, thereby occupying fewer transmission resources.

To resolve the foregoing technical problem, the embodiments of this application provide the following technical solutions.

According to a first aspect, an embodiment of this application provides a data transmission method, including: a first communications device receives flag information sent by a second communications device; and when the flag information indicates that one piece of control information can be used for scheduling of a plurality of transport blocks, the first communications device obtains transport block allocation information sent by the second communications device, where the transport block allocation information indicates the number N of transport blocks scheduled by using the control information and a bit state corresponding to each transport block; and the first communications device sends data to the second communications device based on the flag information and the bit state corresponding to each transport block and by using at least one transport block indicated by the control information, or receives, based on the flag information and the bit state corresponding to each transport block and by using at least one transport block indicated by the control information, data sent by the second communications device, where the at least one transport block belongs to the N transport blocks; or when the flag information indicates that one piece of control information can be used for scheduling of only one transport block, the first communications device obtains hybrid automatic repeat request HARQ process number information sent by the second communications device, where the HARQ process number information indicates a HARQ process number corresponding to the transport block scheduled by using the control information; and the first communications device sends data to the second communications device based on the flag information and the HARQ process number corresponding to the transport block, or receives, based on the flag information and the HARQ process number corresponding to the transport block, data sent by the second communications device.

In this embodiment of this application, to enable the first communications device to obtain the number of transport blocks that is determined by the second communications device, the second communications device may generate the flag information and send the flag information to the first communications device, so that the first communications device can obtain, based on the received flag information, the number of transport blocks that is determined by the second communications device. To reduce indication overheads of the control information, in this embodiment of this application, the flag information generated by the second communications device may be used to indicate that one piece of control information can be used for scheduling of a plurality of transport blocks, or that one piece of control information can be used for scheduling of only one transport block. When the flag information indicates a plurality of transport blocks, the second communications device further sends the transport block allocation information; or when the flag information indicates one transport block, the second communications device further sends the HARQ process number information. In this embodiment of this application, bit overheads of the control information can be optimized, thereby improving transmission performance of the control information.

In a possible design of the first aspect, that a first communications device receives flag information sent by a second communications device includes: the first communications device receives control information sent by the second communications device, where the control information includes the flag information; or the first communications device receives higher layer signaling sent by the second communications device, where the higher layer signaling includes the flag information. After the second communications device generates the flag information, the second communications device may send the flag information in a plurality of manners. For example, the second communications device may send the flag information by using higher layer signaling, where the higher layer signaling may include the flag information, so that the first communications device may receive the higher layer signaling, and may parse the higher layer signaling to obtain the flag information generated by the second communications device. In addition, the second communications device may send the flag information by using physical layer signaling, where the physical layer signaling may include the flag information, so that the first communications device may receive the physical layer signaling, and may parse the physical layer signaling to obtain the flag information generated by the second communications device. For example, the physical layer signaling may be the foregoing control information, and further, the control information may include the flag information.

According to a second aspect, an embodiment of this application further provides a data transmission method, including: a second communications device generates flag information, where the flag information is used to indicate that one piece of control information can be used for scheduling of a plurality of transport blocks, or that one piece of control information can be used for scheduling of only one transport block; and when the flag information indicates that one piece of control information can be used for scheduling of a plurality of transport blocks, the second communications device sends the flag information and transport block allocation information to a first communications device, where the transport block allocation information indicates the number N of transport blocks scheduled by using the control information and a bit state corresponding to each transport block; and the second communications device sends data to the first communications device based on the bit state corresponding to each transport block and by using at least one transport block indicated by the control information, or receives, based on the bit state corresponding to each transport block and by using at least one transport block indicated by the control information, data sent by the first communications device, where the at least one transport block belongs to the N transport blocks; or when the flag information indicates that one piece of control information can be used for scheduling of only one transport block, the second communications device sends the flag information and hybrid automatic repeat request HARQ process number information to the first communications device, where the HARQ process index information indicates a HARQ process number corresponding to the transport block scheduled by using the control information; and the second communications device sends data to the first communications device based on the HARQ process number corresponding to the transport block, or receives, based on the HARQ process number corresponding to the transport block, data sent by the first communications device.

In a possible design of the second aspect, that the second communications device sends the flag information to the first communications device includes: the second communications device sends control information to the first communications device, where the control information includes the flag information; or the second communications device sends higher layer signaling to the first communications device, where the higher layer signaling includes the flag information. After the second communications device generates the flag information, the second communications device may send the flag information in a plurality of manners. For example, the second communications device may send the flag information by using higher layer signaling, where the higher layer signaling may include the flag information, so that the first communications device may receive the higher layer signaling, and may parse the higher layer signaling to obtain the flag information generated by the second communications device. In addition, the second communications device may send the flag information by using physical layer signaling, where the physical layer signaling may include the flag information, so that the first communications device may receive the physical layer signaling, and may parse the physical layer signaling to obtain the flag information generated by the second communications device. For example, the physical layer signaling may be the foregoing control information, and further, the control information may include the flag information.

According to a third aspect, an embodiment of this application provides a communications device. The communications device is specifically a first communications device. The first communications device includes a processing module and a transceiver module. The processing module is configured to receive, by using the transceiver module, flag information sent by a second communications device. The processing module is further configured to: when the flag information indicates that one piece of control information can be used for scheduling of a plurality of transport blocks, obtain, by using the transceiver module, transport block allocation information sent by the second communications device, where the transport block allocation information indicates the number N of transport blocks scheduled by using the control information and a bit state corresponding to each transport block; and send data to the second communications device based on the flag information and the bit state corresponding to each transport block and by using the transceiver module and at least one transport block indicated by the control information, or receive, based on the flag information and the bit state corresponding to each transport block and by using the transceiver module and at least one transport block indicated by the control information, data sent by the second communications device, where the at least one transport block belongs to the N transport blocks; or the processing module is further configured to: when the flag information indicates that one piece of control information can be used for scheduling of only one transport block, obtain, by using the transceiver module, hybrid automatic repeat request HARQ process number information sent by the second communications device, where the HARQ process number information indicates a HARQ process number corresponding to the transport block scheduled by using the control information; and send data to the second communications device based on the flag information and the HARQ process number corresponding to the transport block and by using the transceiver module, or receive, based on the flag information and the HARQ process number corresponding to the transport block and by using the transceiver module, data sent by the second communications device.

In a possible design of the third aspect, the processing module is configured to receive, by using the transceiver module, control information sent by the second communications device, where the control information includes the flag information; or receive, by using the transceiver module, higher layer signaling sent by the second communications device, where the higher layer signaling includes the flag information.

In the third aspect of this application, the composition modules of the first communications device may further perform the steps described in the foregoing first aspect and various possible implementations. For details, refer to the descriptions in the foregoing first aspect and various possible implementations.

According to a fourth aspect, an embodiment of this application provides a communications device. The communications device is specifically a second communications device. The second communications device includes a processing module and a transceiver module. The processing module is configured to generate flag information, where the flag information is used to indicate that one piece of control information can be used for scheduling of a plurality of transport blocks, or that one piece of control information can be used for scheduling of only one transport block. The processing module is further configured to: when the flag information indicates that one piece of control information can be used for scheduling of a plurality of transport blocks, send the flag information and transport block allocation information to the first communications device by using the transceiver module, where the transport block allocation information indicates the number N of transport blocks scheduled by using the control information and a bit state corresponding to each transport block; and send data to the first communications device based on the bit state corresponding to each transport block and by using the transceiver module and at least one transport block indicated by the control information, or receive, based on the bit state corresponding to each transport block and by using the transceiver module and at least one transport block indicated by the control information, data sent by the first communications device, where the at least one transport block belongs to the N transport blocks; or the processing module is further configured to: when the flag information indicates that one piece of control information can be used to schedule only one transport block, send the flag information and hybrid automatic repeat request HARQ process number information to the first communications device by using the transceiver module, where the HARQ process number information indicates a HARQ process number corresponding to the transport block scheduled by using the control information; and send data to the first communications device based on the HARQ process number corresponding to the transport block and by using the transceiver module, or receive, based on the HARQ process number corresponding to the transport block and by using the transceiver module, data sent by the first communications device.

In a possible design of the fourth aspect, the processing module is configured to send control information to the first communications device by using the transceiver module, where the control information includes the flag information; or send higher layer signaling to the first communications device by using the transceiver module, where the higher layer signaling includes the flag information.

In the fourth aspect of this application, the composition modules of the second communications device may further perform the steps described in the foregoing second aspect and various possible implementations. For details, refer to the descriptions in the foregoing second aspect and various possible implementations.

In a possible design of the first aspect, the second aspect, the third aspect, or the fourth aspect, when the flag information indicates that one piece of control information can be used for scheduling of a plurality of transport blocks, the control information further includes the transport block allocation information; or when the flag information indicates that one piece of control information can be used for scheduling of only one transport block, the control information further includes the HARQ process number information. The control information has at least two different bit structures. For example, the control information is DCI. One piece of DCI indicates transmission of a plurality of TBs, the DCI may carry the transport block allocation information, and the first communications device may obtain the transport block allocation information by using the DCI; or one piece of DCI may schedule transmission of only one TB, the DCI may carry the HARQ process number information, and the first communications device may obtain the HARQ process number information by using the DCI.

In a possible design of the first aspect, the second aspect, the third aspect, or the fourth aspect, the transport block allocation information includes M bits, the M bits are $b_0$, $b_1, \ldots,$ and $b_{(M-1)}$, $b_0$ is a leftmost bit of the M bits, and $b_{(M-1)}$ is a rightmost bit of the M bits; and if a $(j+1)^{th}$ bit of the M bits is $b_j$, $b_j=1$, and states of all bits on a left side of $b_j$ are 0 in the M bits, (K−j) TBs are scheduled by using the control information; or if a $(c+1)^{th}$ bit of the M bits is $b_c$, $b_c=0$, and states of all bits on a left side of $b_c$ are 0 in the M bits, (K−c) TBs are scheduled by using the control information, where M is a positive integer, K is a positive integer, and K is less than M; j is an integer, and j is equal to any one of the following values: 0, 1, 2, . . . , and (M−1); and c is an integer, and c is equal to any one of the following values: 0, 1, 2, . . . , and (M−1).

The transport block allocation information includes the M bits, and a value of M may be determined based on a specific scenario, for example, determined based on transmission capabilities of the first communications device and the second communications device and a configured transmission mode. For example, the M bits are $b_0$, $b_1$, . . . , and $b_{(M-1)}$, $b_0$ is the leftmost bit of the M bits, and $b_{(M-1)}$ is the rightmost bit of the M bits, that is, the communications device sequentially obtains values of the bits from left to right in $b_0, b_1, \ldots, b_{(M-1)}$. If the $(j+1)^{th}$ bit of the M bits is $b_j$, $b_j=1$, and the states of all the bits on the left side of $b_j$ are 0 in the M bits, the (K−j) TBs are scheduled by using the control information. The number of TBs scheduled by using the control information is determined from the first bit that is not 0, and K may be a preconfigured positive integer. For example, K may represent the maximum number of TBs that can be scheduled by using one piece of control information. In addition, the $(c+1)^{th}$ bit of the M bits is $b_c$, $b_c=0$, and the states of all the bits on the left side of $b_c$ are 0 in the M bits. Consecutive bits whose values are all 0 determine the number of TBs scheduled by using the control information. For example, the (K−c) TBs are scheduled by using the control information.

In a possible design of the first aspect, the second aspect, the third aspect, or the fourth aspect, each of (K−j) bits on a right side of $b_j$ is associated with one TB. A value of each of the (K−j) bits on the right side of $b_j$ may be used to determine a state of one TB, and the state of the TB associated with each bit may be determined by using each of the (K−j) bits on the right side of $b_j$.

In a possible design of the first aspect, the second aspect, the third aspect, or the fourth aspect, that each of (K−j) bits on a right side of $b_j$ is associated with one TB includes: a $p^{th}$ bit of the (K−j) bits on the right side of $b_j$ is associated with a $p^{th}$ TB indicated by the control information, where p is an integer, and p is equal to any one of the following values: 1, 2, . . . , and (K−j). For example, the first bit of the (K−j) bits on the right side of $b_j$ is associated with the first TB indicated by the control information, and the second bit of the (K−j) bits on the right side of $b_j$ is associated with the second TB indicated by the control information. Therefore, the state of the TB associated with each bit may be determined by using each of the (K−j) bits on the right side of $b_j$.

In a possible design of the first aspect, the second aspect, the third aspect, or the fourth aspect, a bit state of the $p^{th}$ bit of the (K−j) bits on the right side of $b_j$ is a bit state corresponding to the $p^{th}$ TB. The bit state corresponding to the $p^{th}$ TB indicated by the control information may be the bit state of the $p^{th}$ bit of the (K−j) bits on the right side of $b_j$. Therefore, bit states corresponding to the TBs indicated by the control information may be determined by using bit states of the (K−j) bits on the right side of $b_j$.

In a possible design of the first aspect, the second aspect, the third aspect, or the fourth aspect, M=9 and K=8; and/or M=5 and K=4; and/or c=6 or 7; and/or c=2 or 3. Specifically, values of M and K may be configured based on a scenario. For example, M=K+1. In addition, in the embodiments of this application, values of M, K, and c may be configured based on a specific scenario.

In a possible design of the first aspect, the second aspect, the third aspect, or the fourth aspect, the flag information includes X bits, and X is a positive integer; and one of bit states of the X bits of the flag information indicates that the control information can be used for scheduling of a plurality of transport blocks, the control information includes the transport block allocation information, an $i^{th}$ TB of the N transport blocks TBs is $TB_i$, and $TB_i$ is a newly transmitted TB if a bit state corresponding to $TB_i$ is 0, or $TB_i$ is a retransmitted TB if a bit state corresponding to $TB_i$ is 1; and/or one of bit states of the X bits of the flag information indicates that the control information can be used for scheduling of a plurality of transport blocks, the control information includes the transport block allocation information, an $i^{th}$ TB of the N TBs is $TB_i$, and $TB_i$ is a newly transmitted TB if a bit state corresponding to $TB_i$ is 0, or the first communications device does not transmit $TB_i$ or ignores $TB_i$ if a bit state corresponding to $TB_i$ is 1; and/or one of bit states of the X bits of the flag information indicates that the control information can be used for scheduling of a plurality of transport blocks, the control information includes the transport block allocation information, an $i^{th}$ TB of the N TBs is $TB_i$, and $TB_i$ is a retransmitted TB if a bit state corresponding to $TB_i$ is 1, or the first communications device does not transmit $TB_i$ or ignores $TB_i$ if a bit state corresponding to $TB_i$ is 0; and/or one of bit states of the X bits of the flag information indicates that the control information can be used for scheduling of only one transport block, where N is a positive integer, i is an integer, and i is equal to any one of the following values: 1, 2, . . . , and N, or 0, 1, . . . , and (N−1).

In a possible design of the second aspect, that the second communications device sends data to the first communications device based on the bit state corresponding to each transport block and by using at least one transport block indicated by the control information, or receives, based on the bit state corresponding to each transport block and by using at least one transport block indicated by the control information, data sent by the first communications device includes: the second communications device sends the data to the first communications device based on the bit states of the X bits of the flag information and the bit state corresponding to each transport block and by using the at least one transport block indicated by the control information, or receives, based on the bit states of the X bits of the flag information and the bit state corresponding to each transport block and by using the at least one transport block indicated by the control information, the data sent by the first communications device.

In a possible design of the fourth aspect, the processing module included in the second communications device is specifically configured to: send the data to the first communications device based on the bit states of the X bits of the flag information and the bit state corresponding to each transport block and by using the transceiver module included in the second communications device and the at least one transport block indicated by the control information, or receive, based on the bit states of the X bits of the flag information and the bit state corresponding to each transport block and by using the transceiver module included in the second communications device and the at least one transport block indicated by the control information, the data sent by the first communications device.

In a possible design of the first aspect, the second aspect, the third aspect, or the fourth aspect, X=2; and/or a value of N is 1, 2, . . . , or 8; or a value of N is 2, . . . , or 8; or a value of N is 1, 2, 3, or 4; or a value of N is 2, 3, or 4.

According to a fifth aspect, an embodiment of this application provides a computer-readable storage medium. The computer-readable storage medium stores an instruction. When the instruction is run on a computer, the computer is enabled to execute the method according to the first or the second aspect.

According to a sixth aspect, an embodiment of this application provides a computer program product that includes an instruction. When the computer program product is run on a computer, the computer is enabled to execute the method according to the first or the second aspect.

According to a seventh aspect, an embodiment of this application provides a communications device. The communications device may include an entity such as a terminal device or a network device. The communications device includes a processor and a memory. The memory is configured to store an instruction. The processor is configured to execute the instruction in the memory, to enable the communications device to perform the method according to any one of the first aspect or the second aspect.

According to an eighth aspect, this application provides a chip system. The chip system includes a processor, configured to support a communications device in implementing the functions in the foregoing aspect, for example, sending or processing the data and/or information in the foregoing method. In a possible design, the chip system further includes a memory. The memory is configured to store a program instruction and data that are necessary for the communications device. The chip system may include a chip, or may include a chip and another discrete device.

DESCRIPTION OF EMBODIMENTS

Figure 1:
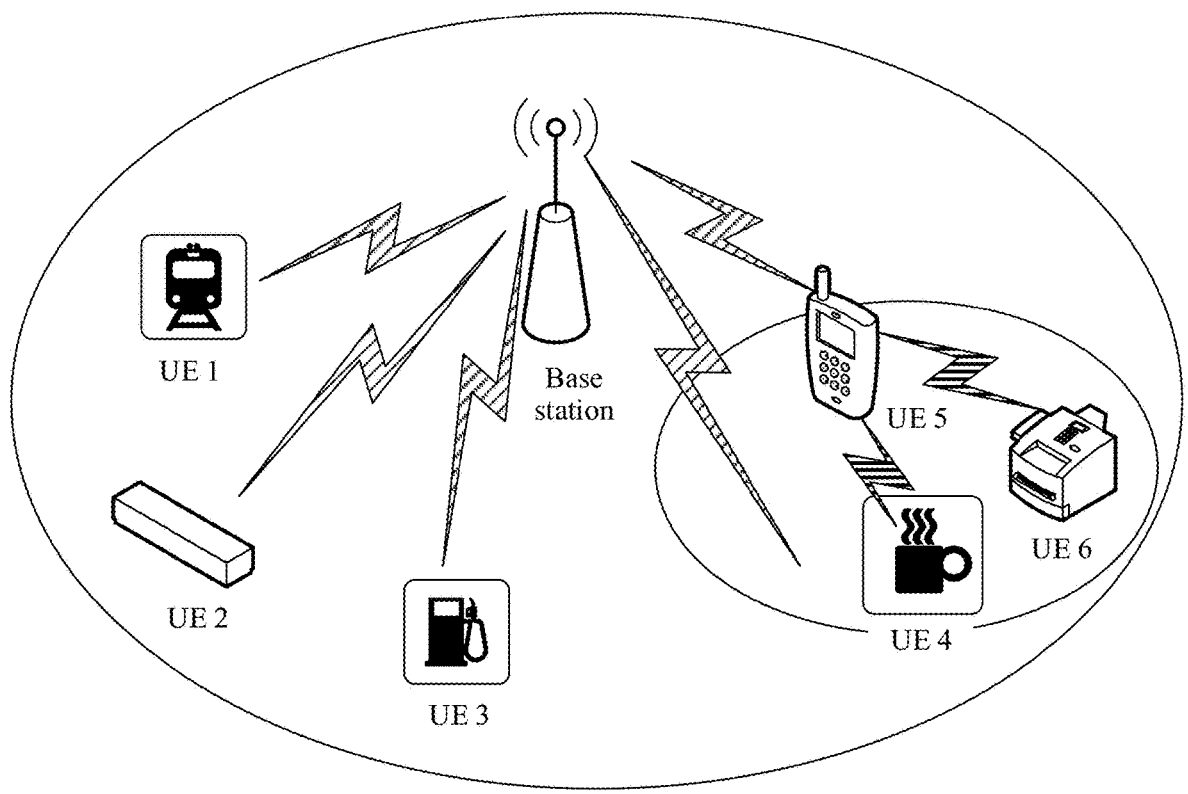
FIG. 1 is a schematic architectural diagram of a system to which a data transmission method is applied according to an embodiment of this application.

Embodiments of this application provide a data transmission method and a device, to reduce indication overheads for scheduling a transport block by using CI, thereby occupying fewer transmission resources.

The following describes the embodiments of this application with reference to accompanying drawings.

In the specification, claims, and accompanying drawings of this application, the terms such as "first" and "second" are intended to distinguish between similar objects but do not necessarily indicate a specific order or sequence. It should be understood that the terms used in such a way are interchangeable in proper circumstances. This is merely a distinguishing manner that is used when objects having a same attribute are described in the embodiments of this application. In addition, the terms "include", "have", and any other variants thereof are intended to cover the non-exclusive inclusion, so that a process, method, system, product, or device that includes a series of units is not necessarily limited to those units, but may include other units not expressly listed or inherent to such a process, method, system, product, or device.

Technical solutions in the embodiments of this application may be applied to various communications systems for data processing, such as a code division multiple access (CDMA) system, a time division multiple access (TDMA) system, a frequency division multiple access (FDMA) system, an orthogonal frequency division multiple access (OFDMA) system, a single carrier frequency division multiple access (single carrier FDMA, SC-FDMA) system, and another system. The terms "system" and "network" can be interchanged with each other. The CDMA system may implement a wireless technology such as universal terrestrial radio access (UTRA) or CDMA2000. UTRA may include a wideband CDMA (WCDMA) technology and another variation technology of CDMA. CDMA2000 may cover an interim standard (IS) 2000 (IS-2000), an IS-95 standard, and an IS-856 standard. The TDMA system may implement a wireless technology such as a global system for mobile communications (GSM). The OFDMA system may implement a radio technology such as evolved universal terrestrial radio access (evolved UTRA, E-UTRA), ultra mobile broadband (UMB), IEEE 802.11 (Wi-Fi), IEEE 802.16 (WiMAX), IEEE 802.20, or Flash OFDMA. UTRA and E-UTRA are respectively UMTS and an evolved release of UMTS. 3GPP uses a new release of UMTS of E-UTRA in long term evolution (LTE) and various releases evolved based on LTE. A 5th generation (5G) communications system and new radio (NR) are next generation communications systems under study. The technical solutions in the embodiments of this application may be applied to various communications systems such as V2X, LTE-V, V2V, an internet of vehicles, MTC, LTE-M, M2M, and an internet of things (IoT). In addition, the communications systems are further applicable to future-oriented communications technologies to which the technical solutions provided in the embodiments of this application are applicable. The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that, with the evolution of the network architecture and the emergence of a new service scenario, the technical solutions provided in the embodiments of this application are also applicable to a similar technical problem.

The communications system provided in the embodiments of this application may include a first communications device and a second communications device, and data transmission may be performed between the first communications device and the second communications device. For example, the first communications device may include a terminal device, and the second communications device may include a network device; or the first communications device may include a terminal device, and the second communications device may include another terminal device; or the first communications device may include a network device, and the second communications device may include another network device.

FIG. 1 is a schematic structural diagram of a possible radio access network (RAN) according to an embodiment of this application. The RAN may be a base station access system of a 2G network (that is, the RAN includes a base station and a base station controller), or may be a base station access system of a 3G network (that is, the RAN includes a base station and an RNC), or may be a base station access system of a 4G network (that is, the RAN includes an eNB and an RNC), or may be a base station access system of a 5G network.

The RAN includes one network device or a plurality of network devices. The network device may be any device having a wireless transceiver function, or may be a chip disposed in a device having a wireless transceiver function. The network device includes but is not limited to a base station (for example, a base station BS, a NodeB NodeB, an evolved NodeB eNodeB or eNB, a gNodeB gNodeB or gNB in a 5th generation 5G communications system, a base station in a future communications system, or an access node, a wireless relay node, or a wireless backhaul node in a WiFi system) or the like. The base station may be a macro base station, a micro base station, a picocell base station, a small cell, a relay station, or the like. A plurality of base stations may support a network of one or more of the foregoing technologies, or a future evolved network. A core network may support a network of one or more of the foregoing technologies, or a future evolved network. The base station may include one or more co-site or non-co-site transmission reception points (TRP). Alternatively, the network device may be an access controller, a centralized unit (CU), a distributed unit (DU), or the like in a cloud radio access network (CRAN) scenario. Alternatively, the network device may be a server, a wearable device, a vehicle-mounted device, or the like. The following provides descriptions by using an example in which the network device is a base station. The plurality of network devices may be base stations of a same type, or may be base stations of different types. The base station may communicate with terminal devices 1 to 6, or may communicate with terminal devices 1 to 6 by using a relay station. The terminal devices 1 to 6 may support communication with a plurality of base stations of different technologies. For example, the terminal devices may support communication with a base station that supports an LTE network, or may support communication with a base station that supports a 5G network, or may support dual connectivity to a base station in an LTE network and a base station in a 5G network. For example, the terminals are connected to a RAN node of a radio network. Currently, the RAN node is, for example, a gNB, a transmission reception point (TRP), an evolved NodeB (eNB), a radio network controller (RNC), a NodeB (Node B, NB), a base station controller (BSC), a base transceiver station (BTS), a home base station (for example, a home evolved NodeB or a home Node B (HNB)), a baseband unit (BBU), or a wireless fidelity (WiFi) access point (AP). In a network structure, the network device may include a centralized unit (CU) node, a distributed unit (DU) node, or a RAN device including a CU node and a DU node.

The terminal devices 1 to 6 each are also referred to as a user equipment (UE), a mobile station (MS), a mobile terminal (MT), a terminal, or the like, and each are a device that provides a user with voice and/or data connectivity, or a chip disposed in the device, for example, a handheld device or a vehicle-mounted device having a wireless connection function. Currently, the terminal device is, for example, a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, or a wireless terminal in a smart home. The terminal device provided in this embodiment of this application may be a low-complexity terminal device and/or a terminal device in a coverage enhancement mode A.

In this embodiment of this application, a base station and UE 1 to UE 6 constitute a communications system. In the communications system, the base station sends one or more of system information, a RAR message, or a paging message to one or more of the UE 1 to the UE 6. In addition, the UE 4 to the UE 6 also constitute a communications system. In the communications system, the UE 5 may be implemented as a function of a base station, and the UE 5 may send one or more of system information, control information, or a paging message to one or more of the UE 4 and the UE 6.

To resolve a prior-art problem of excessive indication overheads for scheduling a transport block by using CI, the embodiments of this application provide the following data transmission method, applicable to a scenario of scheduling a transport block by using control information. In the embodiments of this application, the control information may specifically include downlink control information. In the embodiments of this application, a second communications device generates flag information. The flag information has two types of indication functions: One type indicates that one piece of control information can be used for scheduling of a plurality of transport blocks, and the other type indicates that one piece of control information can be used for scheduling of only one transport block. When the flag information is used to indicate that one piece of control information can be used for scheduling of a plurality of transport blocks, an interaction procedure shown in FIG. 2A and FIG. 2B is executed; or when the flag information is used to indicate that one piece of control information can be used for scheduling of only one transport block, an interaction procedure shown in FIG. 3 is executed.

Figure 2A:
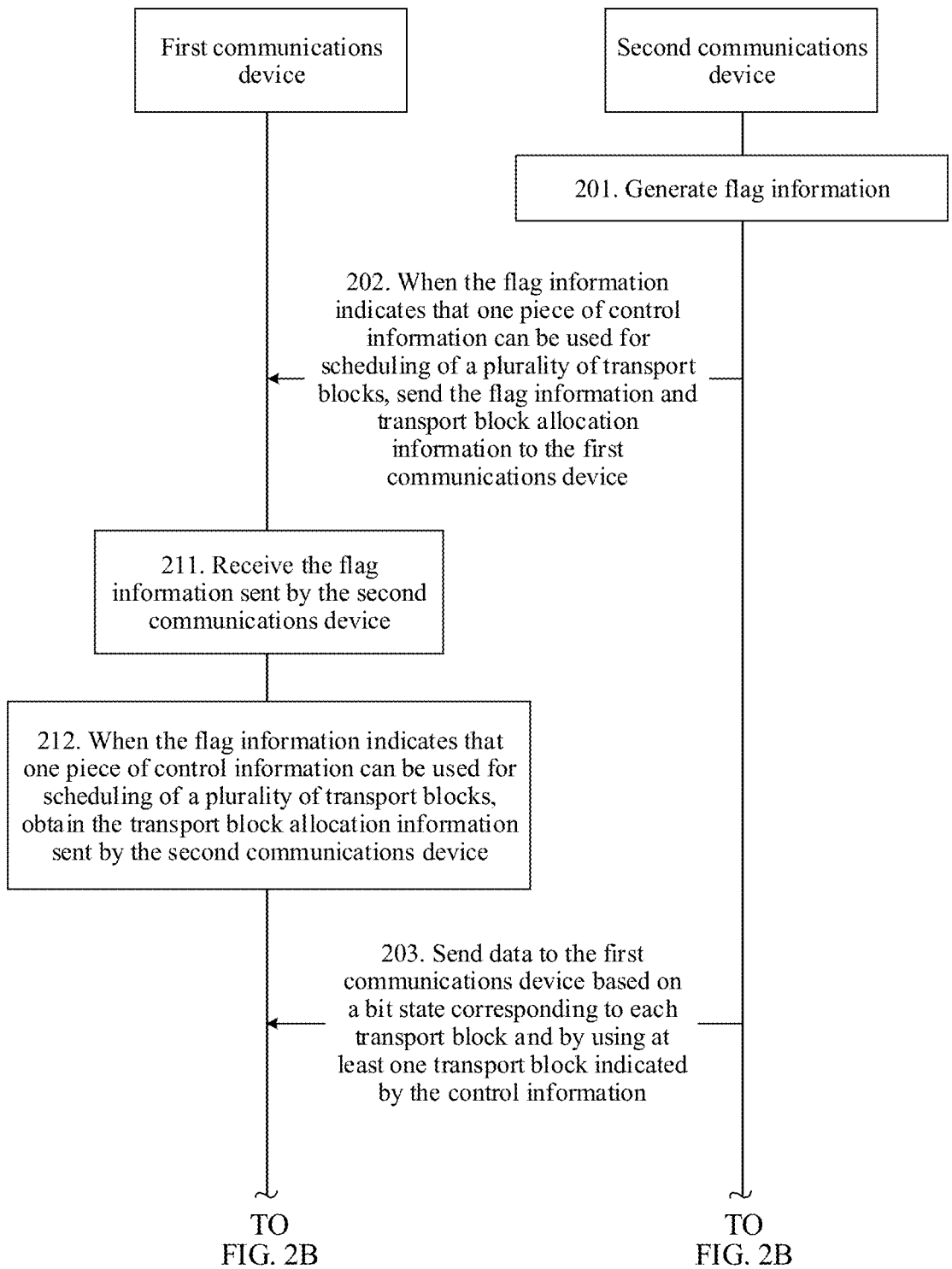
FIG. 2A and FIG. 2B are a schematic block diagram of an interaction procedure between a first communications device and a second communications device according to an embodiment of this application.
Figure 2B:
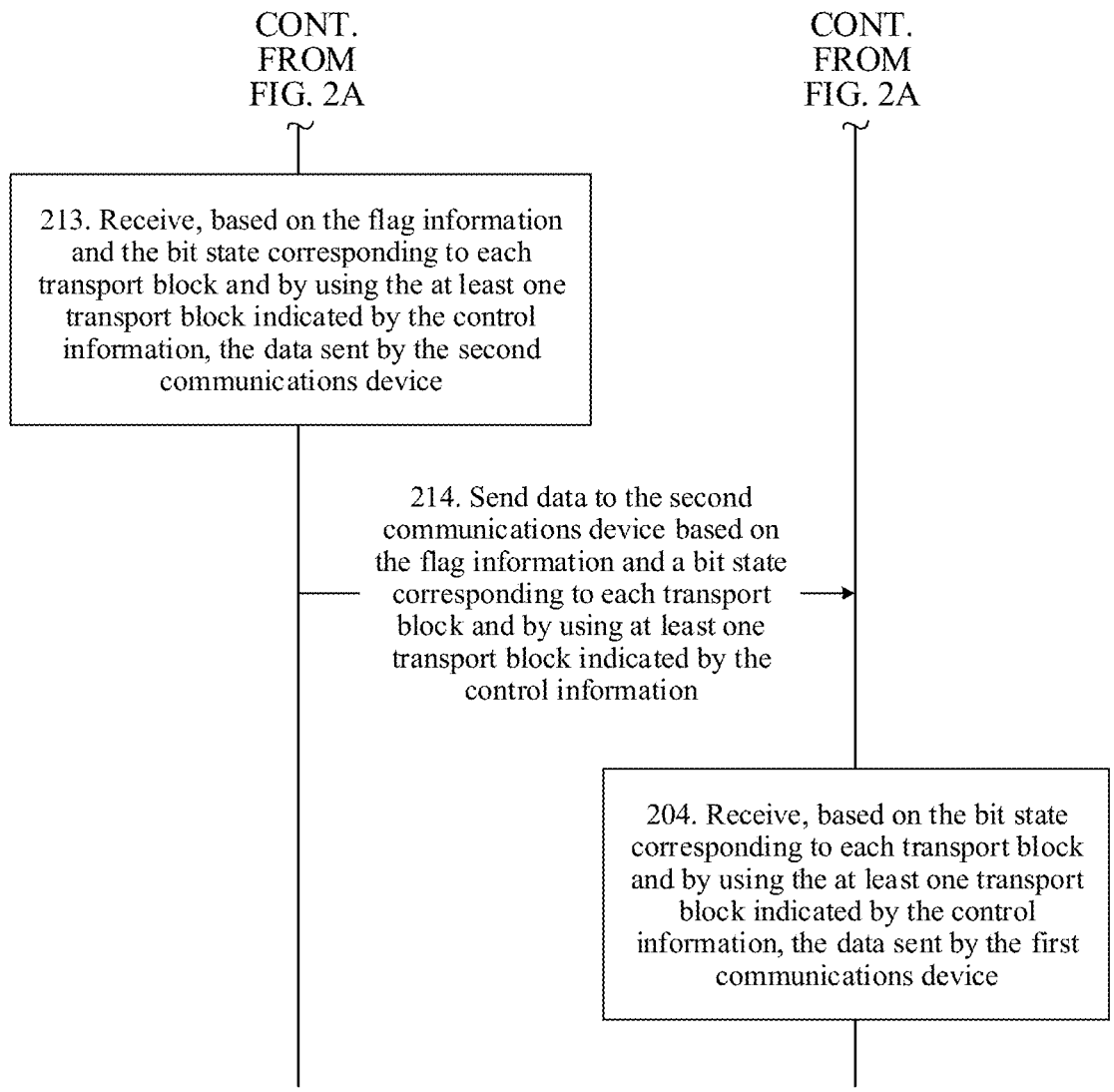
Figure 3:
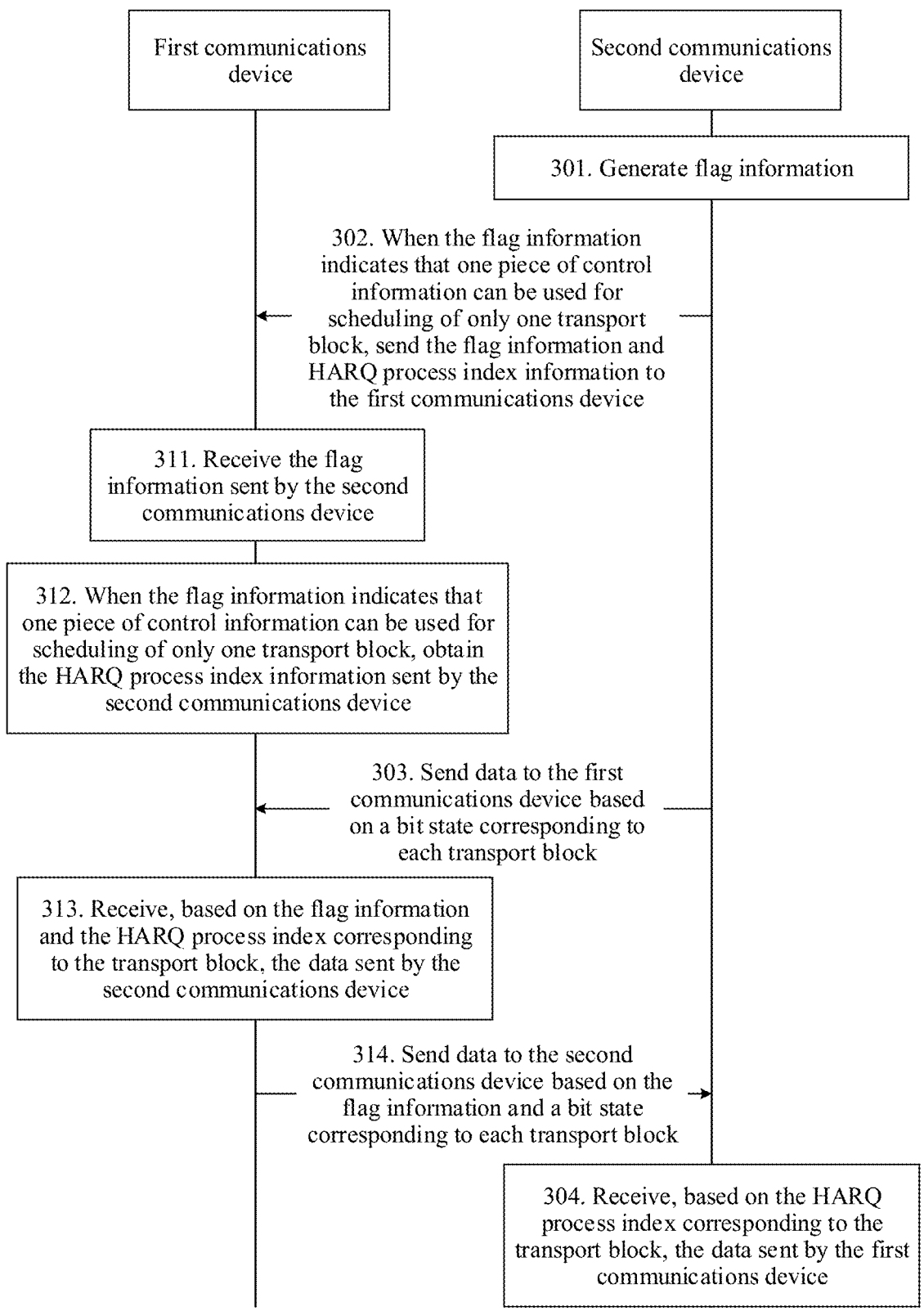
FIG. 3 is a schematic block diagram of another interaction procedure between a first communications device and a second communications device according to an embodiment of this application.

First, refer to FIG. 2A and FIG. 2B. FIG. 2A and FIG. 2B are a schematic diagram of an interaction procedure between a network device and a terminal device according to an embodiment of this application. A data transmission method provided in this embodiment of this application mainly includes the following steps.

201. A second communications device generates flag information.

For example, the flag information may be used to indicate that one piece of control information can be used for scheduling of a plurality of transport blocks, or may be used to indicate that one piece of control information can be used for scheduling of only one transport block.

In this embodiment of this application, the control information is generated by the second communications device. The second communications device delivers a control instruction to a first communications device by using the control information. In subsequent examples, the control information is represented by CI. For example, the second communications device determines the number of transport blocks (TBs) used for data transmission. For example, the second communications device may determine one transport block or a plurality of transport blocks, and the plurality of transport blocks indicate two, three, four, . . . , or eight transport blocks or the like. When the second communications device schedules a plurality of transport blocks by using control information, the second communications device further needs to determine a newly transmitted transport block and/or a retransmitted transport block in all the transport blocks scheduled by using the control information. All the transport blocks scheduled by using the control information may be newly transmitted transport blocks, or may be retransmitted transport blocks; or some of all the transport blocks are newly transmitted and some of all the transport blocks are retransmitted.

Figure 4A:
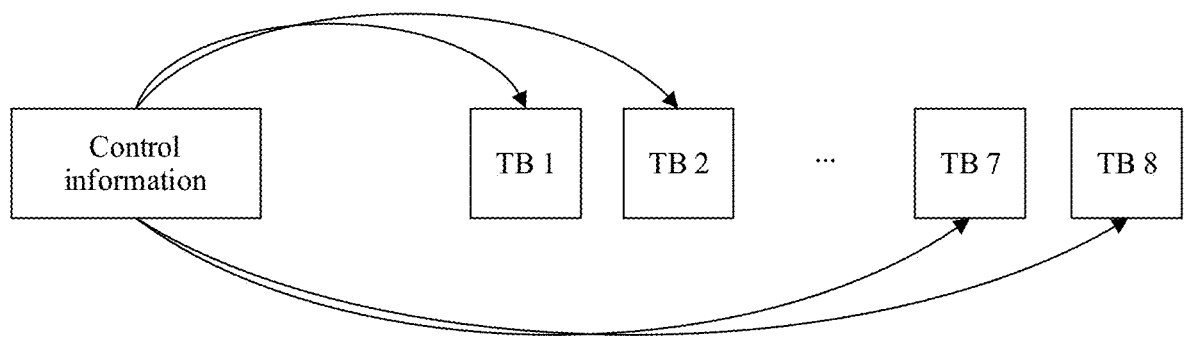
FIG. 4A is a schematic diagram of scheduling transport blocks by using control information according to an embodiment of this application.
Figure 4B:
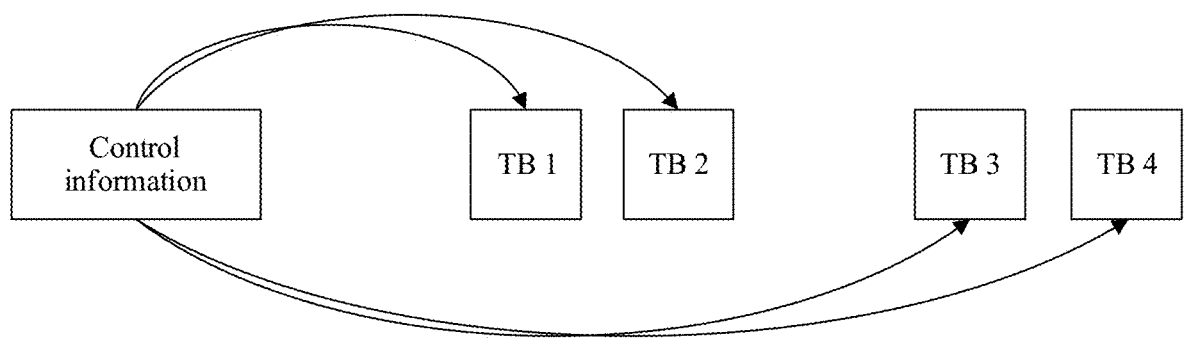
FIG. 4B is another schematic diagram of scheduling transport blocks by using control information according to an embodiment of this application.

Example descriptions are as follows: As shown in FIG. 4A, the control information may be used to schedule eight transport blocks: a TB 1, a TB 2 . . . , a TB 7, and a TB 8. Alternatively, as shown in FIG. 4B, the control information may be used to schedule four transport blocks: a TB 1, a TB 2, a TB 3, and a TB 4. In FIG. 4A and FIG. 4B, each TB corresponds to one transmission state. For example, the TB 1 is a newly transmitted transport block, and the TB 2 is a retransmitted transport block.

In some embodiments of this application, the first communications device may work in a coverage enhancement mode B or at a coverage enhancement level 2 or a coverage enhancement level 3. When the first communications device works in the coverage enhancement mode B, a maximum of four transport blocks may be scheduled by using the control information. Without limitation, the first communications device may alternatively work in another mode, for example, may work in a coverage enhancement mode A or at a coverage enhancement level 0 or a coverage enhancement level 1. When the first communications device works in the coverage enhancement mode A, a maximum of eight transport blocks may be scheduled by using the control information.

To indicate the number of transport blocks scheduled by using the control information and indicate a type of a to-be-transmitted transport block, the second communications device may generate the flag information. The flag information is used to indicate that one piece of control information can be used for scheduling of a plurality of transport blocks, or that one piece of control information can be used for scheduling of only one transport block. That one piece of control information can be used for scheduling of a plurality of transport blocks indicates that one piece of control information can be used to schedule a plurality of transport blocks, and that one piece of control information can be used for scheduling of only one transport block indicates that one piece of control information cannot be used to schedule a plurality of transport blocks, but is used for scheduling of a single transport block.

202. When the flag information indicates that one piece of control information can be used for scheduling of a plurality of transport blocks, the second communications device sends the flag information and transport block allocation information to the first communications device, where the transport block allocation information indicates the number N of transport blocks scheduled by using the control information and a bit state corresponding to each transport block.

In this embodiment of this application, when the flag information indicates that one piece of control information can be used for scheduling of a plurality of transport blocks, the flag information further indicates the transport block allocation information sent by the second communications device. The transport block allocation information may also be referred to as TB allocation indication information or TB scheduling indication information. The second communications device generates the transport block allocation information based on the number N of transport blocks scheduled by using the control information and the bit state corresponding to each transport block. The second communications device sends the flag information and the transport block allocation information to the first communications device. For example, the transport block allocation information includes M bits, the M bits are $b_0, b_1, \ldots,$ and $b_{(M-1)}$, and the number N of transport blocks scheduled by using the control information and the bit state corresponding to each transport block may be indicated by using bit states of the M bits.

In some embodiments of this application, to enable the first communications device to obtain the number of transport blocks that is determined by the second communications device, the second communications device may generate the flag information and send the flag information to the first communications device, so that the first communications device can obtain, based on the received flag information, the number of transport blocks that is determined by the second communications device. In addition, when the flag information sent by the second communications device is used to indicate that one piece of control information is used to schedule a plurality of transport blocks, the flag information may further indicate the first communications device to receive the transport block allocation information sent by the second communications device.

It should be noted that in step 202, the second communications device sends the flag information and the transport block allocation information to the first communications device. The flag information and the transport block allocation information may be transmitted by using same information; or the flag information and the transport block allocation information may be separately transmitted by using different information, for example, the flag information is transmitted by using higher layer signaling, and the transport block allocation information is transmitted by using control information.

In some embodiments of this application, in step 202, that the second communications device sends the flag information to the first communications device includes:

the second communications device sends control information to the first communications device, where the control information includes the flag information; or the second communications device sends higher layer signaling to the first communications device, where the higher layer signaling includes the flag information.

After the second communications device generates the flag information, the second communications device may send the flag information in a plurality of manners. For example, the second communications device may send the flag information by using higher layer signaling, where the higher layer signaling may include the flag information, so that the first communications device may receive the higher layer signaling, and may parse the higher layer signaling to obtain the flag information generated by the second communications device. For example, the higher layer signaling may include radio resource control (RRC) signaling. In addition, the second communications device may send the flag information by using physical layer signaling, where the physical layer signaling may include the flag information, so that the first communications device may receive the physical layer signaling, and may parse the physical layer signaling to obtain the flag information generated by the second communications device. For example, the physical layer signaling may be the foregoing control information, and further, the control information may include the flag information.

In some embodiments of this application, when the flag information indicates that one piece of control information can be used for scheduling of a plurality of transport blocks, the control information further includes the transport block allocation information.

Both the transport block allocation information and the flag information may be transmitted by using the control information, a location relationship between the transport block allocation information and the flag information in the control information and quantities of bits occupied by the transport block allocation information and the flag information in the control information are not limited. The transport block allocation information and the flag information are transmitted by using the control information, so that the first communications device can obtain the transport block allocation information and the flag information by receiving the control information, and then complete data transmission based on the transport block allocation information and the flag information.

203. The second communications device sends data to the first communications device based on the bit state corresponding to each transport block and by using at least one transport block indicated by the control information, where the at least one transport block belongs to the N transport blocks; or

204. The second communications device receives, based on the bit state corresponding to each transport block and by using at least one transport block indicated by the control information, data sent by the first communications device, where the at least one transport block belongs to the N transport blocks.

In this embodiment of this application, after the second communications device sends the flag information and the transport block allocation information to the first communications device, the second communications device may perform data transmission with the first communications device based on the determined bit state corresponding to each transport block and by using at least one transport block indicated by the control information. For example, the second communications device determines, based on the flag information, the number of transport blocks that can be used for current data transmission, and the second communications device determines, based on the determined bit state corresponding to each transport block, a state of a transport block that can be used for the current data transmission. Likewise, the first communications device determines, based on the flag information, the number of transport blocks that can be used for the current data transmission, and the first communications device determines, based on the determined bit state corresponding to each transport block, the state of the transport block that can be used for the current data transmission. Further, when the second communications device sends the data to the first communications device, the second communications device further needs to determine whether each of all the transport blocks scheduled by using the control information is a newly transmitted transport block or a retransmitted transport block.

211. The first communications device receives the flag information sent by the second communications device.

In some embodiments of this application, to enable the first communications device to obtain the number of transport blocks that is determined by the second communications device, the second communications device may generate the flag information and send the flag information to the first communications device, so that the first communications device can obtain, based on the received flag information, the number of transport blocks that is determined by the second communications device. In addition, when the flag information sent by the second communications device is used to indicate that one piece of control information is used to schedule a plurality of transport blocks, the flag information may further indicate the first communications device to receive the transport block allocation information sent by the second communications device.

In some embodiments of this application, in step 211, that the first communications device receives the flag information sent by the second communications device may include the following step:

the first communications device receives the higher layer signaling sent by the second communications device, where the higher layer signaling includes the flag information; or the first communications device receives the control information sent by the second communications device, where the control information includes the flag information.

After the second communications device generates the flag information, the second communications device may send the flag information in a plurality of manners. For example, the second communications device may send the flag information by using higher layer signaling, where the higher layer signaling may include the flag information, so that the first communications device may receive the higher layer signaling, and may parse the higher layer signaling to obtain the flag information generated by the second communications device. For example, the higher layer signaling may include RRC signaling. In addition, the second communications device may send the flag information by using physical layer signaling, where the physical layer signaling may include the flag information, so that the first communications device may receive the physical layer signaling, and may parse the physical layer signaling to obtain the flag information generated by the second communications device. For example, the physical layer signaling may be the foregoing control information, and further, the control information may include the flag information.

212. When the flag information indicates that one piece of control information can be used for scheduling of a plurality of transport blocks, the first communications device obtains the transport block allocation information sent by the second communications device, where the transport block allocation information indicates the number N of transport blocks scheduled by using the control information and the bit state corresponding to each transport block.

In this embodiment of this application, when the flag information indicates that one piece of control information can be used for scheduling of a plurality of transport blocks, the flag information further indicates the transport block allocation information sent by the second communications device. The transport block allocation information may also be referred to as TB allocation indication information or TB scheduling indication information. The first communications device receives the transport block allocation information sent by the second communications device, and determines, based on the transport block allocation information, the number N of transport blocks scheduled by using the control information and the bit state corresponding to each transport block. For example, the transport block allocation information includes the M bits, the M bits are $b_0, b_1, \ldots$ and $b_{(M-1)}$, the number N of transport blocks scheduled by using the control information and the bit state corresponding to each transport block may be indicated by using the bit states of the M bits.

213. The first communications device receives, based on the flag information and the bit state corresponding to each transport block and by using the at least one transport block indicated by the control information, the data sent by the second communications device, where the at least one transport block belongs to the N transport blocks; or

214. The first communications device sends the data to the second communications device based on the flag information and the bit state corresponding to each transport block and by using the at least one transport block indicated by the control information, where the at least one transport block belongs to the N transport blocks.

In this embodiment of this application, after the second communications device sends the transport block allocation indication information to the first communications device, the first communications device may perform data transmission with the second communications device based on the flag information and the determined bit state corresponding to each transport block and by using the at least one transport block indicated by the control information. For example, the second communications device determines, based on the flag information, the number of transport blocks that can be used for current data transmission, and the second communications device determines, based on the determined bit state corresponding to each transport block, a state of a transport block that can be used for the current data transmission. Likewise, the first communications device determines, based on the flag information, the number of transport blocks that can be used for the current data transmission, and the first communications device determines, based on the determined bit state corresponding to each transport block, the state of the transport block that can be used for the current data transmission. Further, when the first communications device sends the data to the second communications device, the first communications device further needs to determine whether each of all the transport blocks scheduled by using the control information is a newly transmitted transport block or a retransmitted transport block.

First, refer to FIG. 3. FIG. 3 is a schematic diagram of an interaction procedure between a network device and a terminal device according to an embodiment of this application. A data transmission method provided in this embodiment of this application mainly includes the following steps.

301. A second communications device generates flag information, where the flag information is used to indicate that one piece of control information can be used for scheduling of a plurality of transport blocks, or that one piece of control information can be used for scheduling of only one transport block.

Step 301 is similar to step 201 in the foregoing embodiment, and details are not described herein again.

302. When the flag information indicates that one piece of control information can be used for scheduling of only one transport block, the second communications device sends the flag information and hybrid automatic repeat request (HARQ) process number information to a first communications device, where the HARQ process number information indicates a HARQ process number corresponding to the transport block scheduled by using the control information.

In this embodiment of this application, when the flag information indicates that one piece of control information can be used for scheduling of only one transport block, the flag information further indicates the HARQ process number information sent by the second communications device. The second communications device generates the HARQ process number information based on the transport block scheduled by using the control information and the HARQ process number corresponding to the transport block. The HARQ process number information may also be referred to as HARQ process number indication information. The second communications device sends the flag information and the HARQ process number information to the first communications device. For example, 3 bits in the control information may be used for HARQ process number indication.

It should be noted that in step 302, the second communications device sends the flag information and the HARQ process number information to the first communications device. The flag information and the HARQ process number information may be transmitted by using same information; or the flag information and the HARQ process number information may be separately transmitted by using different information, for example, the flag information is transmitted by using higher layer signaling, and the HARQ process number information is transmitted by using control information.

In some embodiments of this application, when the flag information indicates that one piece of control information can be used for scheduling of only one transport block, the control information includes the HARQ process number information.

Both the HARQ process number information and the flag information may be transmitted by using the control information, a location relationship between the HARQ process number information and the flag information in the control information and quantities of bits occupied by the HARQ process number information and the flag information in the control information are not limited. The HARQ process number information and the flag information are transmitted by using the control information, so that the first communications device can obtain the HARQ process number information and the flag information by receiving the control information, and then complete data transmission based on the HARQ process number information and the flag information.

In some embodiments of this application, when the flag information indicates that one piece of control information can be used for scheduling of a plurality of transport blocks, the control information further includes transport block allocation information, or when the flag information indicates that one piece of control information can be used for scheduling of only one transport block, the control information further includes the HARQ process number information.

The control information has at least two different bit structures. For example, the control information is DCI. One piece of DCI indicates transmission of a plurality of TBs, a first bit structure is used for the DCI, and UE interprets bit information of the DCI based on the first bit structure. In addition, one piece of DCI may alternatively schedule transmission of only one TB, a second bit structure is used for the DCI, and UE interprets bit information of the DCI based on the second bit structure. In subsequent embodiments, the first bit structure and the second bit structure are described in detail by using examples.

303. The second communications device sends data to the first communications device based on the HARQ process number corresponding to the transport block; or

304. The second communications device receives, based on the HARQ process number corresponding to the transport block, data sent by the first communications device.

In this embodiment of this application, after the second communications device sends the HARQ process number information to the first communications device, the second communications device may perform data transmission with the first communications device based on the determined HARQ process number corresponding to the transport block. For example, the second communications device determines, based on the flag information, the number of transport blocks that can be used for current data transmission, and the second communications device determines, based on the determined HARQ process number corresponding to the transport block, a HARQ process number that can be used for the current data transmission. Likewise, the first communications device determines, based on the flag information, the number of transport blocks that can be used for the current data transmission, and the first communications device determines, based on the determined HARQ process number corresponding to the transport block, the HARQ process number that can be used for the current data transmission. Further, when the second communications device sends the data to the first communications device, the second communications device further needs to determine whether each of all transport blocks scheduled by using the control information is a newly transmitted transport block or a retransmitted transport block.

It should be noted that, execution of one of step 303 and step 304 may be determined based on an application scenario. This is not limited herein.

311. The first communications device receives the flag information sent by the second communications device.

In some embodiments of this application, to enable the first communications device to obtain the number of transport blocks that is determined by the second communications device, the second communications device may generate the flag information and send the flag information to the first communications device, so that the first communications device can obtain, based on the received flag information, the number of transport blocks that is determined by the second communications device. In addition, when the flag information sent by the second communications device is used to indicate that one piece of control information is used for scheduling of only one transport block, the flag information may further indicate the first communications device to receive the HARQ process number information sent by the second communications device.

312. When the flag information indicates that one piece of control information can be used for scheduling of only one transport block, the first communications device obtains the hybrid automatic repeat request HARQ process number information sent by the second communications device, where the HARQ process number information indicates the HARQ process number corresponding to the transport block scheduled by using the control information.

313. The first communications device receives, based on the flag information and the HARQ process number corresponding to the transport block, the data sent by the second communications device; or 314. The first communications device sends the data to the second communications device based on the flag information and the HARQ process number corresponding to the transport block.

In this embodiment of this application, after the second communications device sends the HARQ process number information to the first communications device, the first communications device may perform data transmission with the second communications device based on the flag information and the determined HARQ process number corresponding to the transport block. For example, the second communications device determines, based on the flag information, the number of transport blocks that can be used for current data transmission, and the second communications device determines, based on the determined HARQ process number corresponding to the transport block, a HARQ process number that can be used for the current data transmission. Likewise, the first communications device determines, based on the flag information, the number of transport blocks that can be used for the current data transmission, and the first communications device determines, based on the determined HARQ process number corresponding to the transport block, the HARQ process number that can be used for the current data transmission. Further, when the first communications device sends the data to the second communications device, the first communications device further needs to determine whether each of all transport blocks scheduled by using the control information is a newly transmitted transport block or a retransmitted transport block.

In some embodiments of this application, the transport block allocation information generated by the second communications device includes M bits, the M bits are $b_0$, $b_1, \ldots,$ and $b_{(M-1)}$, $b_0$ is a leftmost bit of the M bits, and $b_{(M-1)}$ is a rightmost bit of the M bits; and if a $(j+1)^{th}$ bit of the M bits is $b_j$, $b_j=1$, and states of all bits on a left side of $b_j$ are 0 in the M bits, (K−j) TBs are scheduled by using the control information; or if a $(c+1)^{th}$ bit of the M bits is $b_c$, $b_c=0$, and states of all bits on a left side of $b_c$ are 0 in the M bits, (K−c) TBs are scheduled by using the control information, where M is a positive integer, K is a positive integer, and K is less than M;

j is an integer, and j is equal to any one of the following values: 0, 1, 2, . . . , and (M−1); and c is an integer, and c is equal to any one of the following values: 0, 1, 2, . . . , and (M−1).

The transport block allocation information includes the M bits, and a value of M may be determined based on a specific scenario, for example, determined based on transmission capabilities of the first communications device and the second communications device and a configured transmission mode. For example, the M bits are $b_0$, $b_1, \ldots,$ and $b_{(M-1)}$, $b_0$ is the leftmost bit of the M bits, and $b_{(M-1)}$ is the rightmost bit of the M bits, that is, the communications device sequentially obtains values of the bits from left to right in $b_0$, $b_1, \ldots,$ and $b_{(M-1)}$. If the $(j+1)^{th}$ bit of the M bits is $b_j$, $b_j=1$, and the states of all the bits on the left side of $b_j$ are 0 in the M bits, the (K−j) TBs are scheduled by using the control information. The number of TBs scheduled by using the control information is determined from the first bit that is not 0, and K may be a preconfigured positive integer. For example, K may represent the maximum number of TBs that can be scheduled by using one piece of control information. In addition, the $(c+1)^{th}$ bit of the M bits is $b_c$, $b_c=0$, and the states of all the bits on the left side of $b_c$ are 0 in the M bits. Consecutive bits whose values are all 0 determine the number of TBs scheduled by using the control information. For example, the (K−c) TBs are scheduled by using the control information.

In some embodiments of this application, if the $(j+1)^{th}$ bit of the M bits is $b_j$, $b_j=1$, and the states of all the bits on the left side of $b_j$ are 0 in the M bits, the (K−j) TBs are scheduled by using the control information, and states of the (K−j) TBs scheduled by using the control information may be determined by using bit statues of $b_{j+1}, \ldots,$ and $b_{(M-1)}$.

It should be noted that, in the foregoing embodiments, the method in the embodiments of this application is described by using an example in which a bit position of the left first bit that is 1 is used to indicate the number of TBs scheduled by using the control information. Actually, some changes or replacements made to bit locations or bit states in the foregoing embodiments still fall within the protection scope of the embodiments of this application. For example, a bit position of the right first bit that is 1 in $b_0$, $b_1, \ldots,$ $b_{(M-1)}$ is used to indicate the number of TBs scheduled by using the control information. For example, a bit position of the left first bit that is 0 in $b_0$, $b_1, \ldots,$ $b_{(M-1)}$ is used to indicate the number of TBs scheduled by using the control information. For example, a bit position of the right first bit that is 0 in $b_0$, $b_1, \ldots,$ $b_{(M-1)}$ is used to indicate the number of TBs scheduled by using the control information.

In some embodiments of this application, each of (K−j) bits on a right side of $b_j$ is associated with one TB.

A value of each of the (K−j) bits on the right side of $b_j$ may be used to determine a state of one TB, and the state of the TB associated with each bit may be determined by using each of the (K−j) bits on the right side of h.

Further, in some embodiments of this application, that each of (K−j) bits on a right side of $b_j$ is associated with one TB includes: a $p^{th}$ bit of the (K−j) bits on the right side of $b_j$ is associated with a $p^{th}$ TB indicated by the control information, where p is an integer, and p is equal to any one of the following values: 1, 2, . . . , and (K−j).

For example, the first bit of the (K−j) bits on the right side of $b_j$ is associated with the first TB indicated by the control information, and the second bit of the (K−j) bits on the right side of $b_j$ is associated with the second TB indicated by the control information. Therefore, the state of the TB associated with each bit may be determined by using each of the (K−j) bits on the right side of $b_j$.

In some embodiments of this application, that each of (K−j) bits on a right side of $b_j$ is associated with one TB includes: HARQ process numbers of the (K−j) TBs associated with the (K−j) bits on the right side of $b_j$ are consecutive. Further, when the HARQ process numbers of the (K−j) TBs associated with the (K−j) bits on the right side of $b_j$ are consecutive, a HARQ process number of the first TB in the (K−j) TBs is fixed at 0. The HARQ process numbers of the (K−j) TBs are consecutive, so that values of HARQ process numbers of all the TBs indicated by the control information can be quickly determined.

In some embodiments of this application, a bit state of the $p^{th}$ bit of the (K−j) bits on the right side of $b_j$ is a bit state corresponding to the $p^{th}$ TB.

The bit state corresponding to the $p^{th}$ TB indicated by the control information may be the bit state of the $p^{th}$ bit of the (K−j) bits on the right side of $b_j$. Therefore, bit states corresponding to the TBs indicated by the control information may be determined by using bit states of the (K−j) bits on the right side of $b_j$.

In some embodiments of this application, values of M and K may meet the following relationship: M=9 and K=8; and/or M=5 and K=4. Specifically, the values of M and K may be configured based on a scenario. For example, M=K+1. In addition, in the embodiments of this application, c=6 or 7; and/or c=2 or 3. For details, refer to example descriptions of values of M, K, and c in subsequent embodiments.

In some embodiments of this application, the flag information includes X bits, and X is a positive integer; and one of bit states of the X bits of the flag information indicates that the control information can be used for scheduling of a plurality of transport blocks, the control information includes the transport block allocation information, an $i^{th}$ TB of the N transport blocks TBs is $TB_i$, and $TB_i$ is a newly transmitted TB if a bit state corresponding to $TB_i$ is 0, or $TB_i$ is a retransmitted TB if a bit state corresponding to $TB_i$ is 1; and/or one of bit states of the X bits of the flag information indicates that the control information can be used for scheduling of a plurality of transport blocks, the control information includes the transport block allocation information, an $i^{th}$ TB of the N TBs is $TB_i$, and $TB_i$ is a newly transmitted TB if a bit state corresponding to $TB_i$ is 0, or the first communications device does not transmit $TB_i$ or ignores $TB_i$ if a bit state corresponding to $TB_i$ is 1; and/or one of bit states of the X bits of the flag information indicates that the control information can be used for scheduling of a plurality of transport blocks, the control information includes the transport block allocation information, an $i^{th}$ TB of the N TBs is $TB_i$, and $TB_i$ is a retransmitted TB if a bit state corresponding to $TB_i$ is 1, or the first communications device does not transmit $TB_i$ or ignores $TB_i$ if a bit state corresponding to $TB_i$ is 0; and/or one of bit states of the X bits of the flag information indicates that the control information can be used for scheduling of only one transport block, where N is a positive integer, i is an integer, and i is equal to any one of the following values: 1, 2, . . . , and N, or 0, 1, . . . , and (N−1).

One of the bit states of the X bits of the flag information indicates a first function, that is, one piece of control information can be used for scheduling of a plurality of transport blocks. If the second communications device indicates that a bit state of a TB is 0, the TB is a newly transmitted TB, and the first communications device transmits the newly transmitted TB; or if the second communications device indicates that a bit state of a TB is 1, the TB is a retransmitted TB, and the first communications device transmits the retransmitted TB. Optionally, the first bit structure is used for the control information, and the first communications device interprets bit information of the control information based on the first bit structure. Without limitation, it may be determined, based on a bit state 1, that a TB is newly transmitted, or may be determined, based on a bit state 0, that a TB is retransmitted.

Another of the bit states of the X bits of the flag information indicates a second function, that is, one piece of control information indicates transmission of a plurality of TBs. If the second communications device indicates that a bit state of a TB is 0, the TB is a newly transmitted TB, and the first communications device transmits the newly transmitted TB; or If the second communications device indicates that a bit state of a TB is 1, the second communications device indicates the first communications device not to transmit the TB or to ignore the TB indicated by the second communications device. Optionally, the TB may be a retransmitted TB and/or an unscheduled TB. Optionally, the first bit structure is used for the control information, and the first communications device interprets bit information of the control information based on the first bit structure. It may be understood that, in the embodiments of this application, a manner used in which the first communications device does not transmit $TB_i$ or a manner used in which the first communications device ignores $TB_i$ is configured based on a specific scenario.

Another of the bit states of the X bits of the flag information indicates a third function, that is, one piece of control information indicates transmission of a plurality of TBs. If the second communications device indicates that a bit state of a TB is 1, the TB is a retransmitted TB, and the first communications device transmits the retransmitted TB; or If the second communications device indicates that a bit state of a TB is 0, the second communications device indicates the first communications device not to transmit the TB or to ignore the TB indicated by the second communications device. Optionally, the TB may be a newly transmitted TB and/or an unscheduled TB. Optionally, the first bit structure is used for the control information, and the first communications device interprets bit information of the control information based on the first bit structure.

Another of the bit states of the X bits of the flag information indicates a fourth function, that is, one piece of control information can be used for scheduling of only one transport block. Optionally, the second bit structure is used for the control information, and the first communications device interprets bit information of the control information based on the second bit structure.

In some embodiments of this application, that the second communications device sends data to the first communications device based on the bit state corresponding to each transport block and by using at least one transport block indicated by the control information, or receives, based on the bit state corresponding to each transport block and by using at least one transport block indicated by the control information, data sent by the first communications device includes:

the second communications device sends the data to the first communications device based on the bit states of the X bits of the flag information and the bit state corresponding to each transport block and by using the at least one transport block indicated by the control information, or receives, based on the bit states of the X bits of the flag information and the bit state corresponding to each transport block and by using the at least one transport block indicated by the control information, the data sent by the first communications device.

The foregoing provides example descriptions for different functions indicated by the bit states of the X bits of the flag information. Based on a specific limitation of the flag information, the second communications device needs to perform data sending/receiving by using the bit states of the X bits of the flag information and the bit state corresponding to each transport block and by using at least one transport block indicated by the control information.

Further, in some embodiments of this application, the number of bits of the flag information is X=2; and/or a value of N is 1, 2, . . . , or 8; or
a value of N is 2, . . . , or 8; or
a value of N is 1, 2, 3, or 4; or
a value of N is 2, 3, or 4.

If a value of X is 2, the flag information has four bit states: 00, 01, 10, and 11. For example, the flag information includes 2 bits, and the 2 bits indicate one or more of the first function, the second function, the third function, or the fourth function. Specifically, the value of X may be configured based on a scenario.

In addition, in the embodiments of this application, the control information indicates the N TBs, a maximum value of N may be 8, and the value of N may be any value of 1, 2, . . . , or 8. For example, the value of N is 1, 3, 4, 5, 6, or 7. For another example, the value of N may be any value of 2, . . . , or 8. For another example, a maximum value of N may be 4, and the value of N may be any val ue of 1, 2, 3, or 4. For another example, the value of N may be any value of 2, 3, or 4. Specifically, the number of TB blocks indicated by the control information may be determined based on an application scenario.

It may be learned from the foregoing example descriptions that, in the embodiments of this application, to enable the first communications device to obtain the number of transport blocks that is determined by the second communications device, the second communications device may generate the flag information and send the flag information to the first communications device, so that the first communications device can obtain, based on the received flag information, the number of transport blocks that is determined by the second communications device. To reduce indication overheads of the control information, in the embodiments of this application, the flag information generated by the second communications device may be used to indicate that one piece of control information can be used for scheduling of a plurality of transport blocks, or that one piece of control information can be used for scheduling of only one transport block. When the flag information indicates a plurality of transport blocks, the second communications device further sends the transport block allocation information; or when the flag information indicates one transport block, the second communications device further sends the HARQ process number information. In the embodiments of this application, bit overheads of the control information can be optimized, thereby improving transmission performance of the control information.

To better understand and implement the foregoing solutions in the embodiments of this application, the following provides detailed descriptions by using an example of a corresponding application scenario.

In the embodiments of this application, the second communications device sends the flag information to the first communications device. The second communications device may be a base station, or a device having a sending capability. The first communications device may be user equipment, a device having a receiving capability, or a base station. An example in which the first communications device is UE and the second communications device is a base station is used for description. The foregoing control information is specifically DCI. In the embodiments of this application, when the DCI is used to schedule a plurality of transport blocks, indication overheads of the DCI can be reduced, thereby improving resource efficiency. For example, the first communications device sends the flag information to the second communications device by using downlink control information. That is, the downlink control information includes the flag information. Alternatively, the first communications device sends the flag information to the second communications device by using radio resource control signaling or media access control signaling. That is, the radio resource control signaling or the media access control signaling includes the flag information.

It should be noted that the transmission in the embodiments of this application is sending or receiving. If an end of communication implements transmission as sending, a peer end of the communication implements transmission as receiving.

Figure 5:
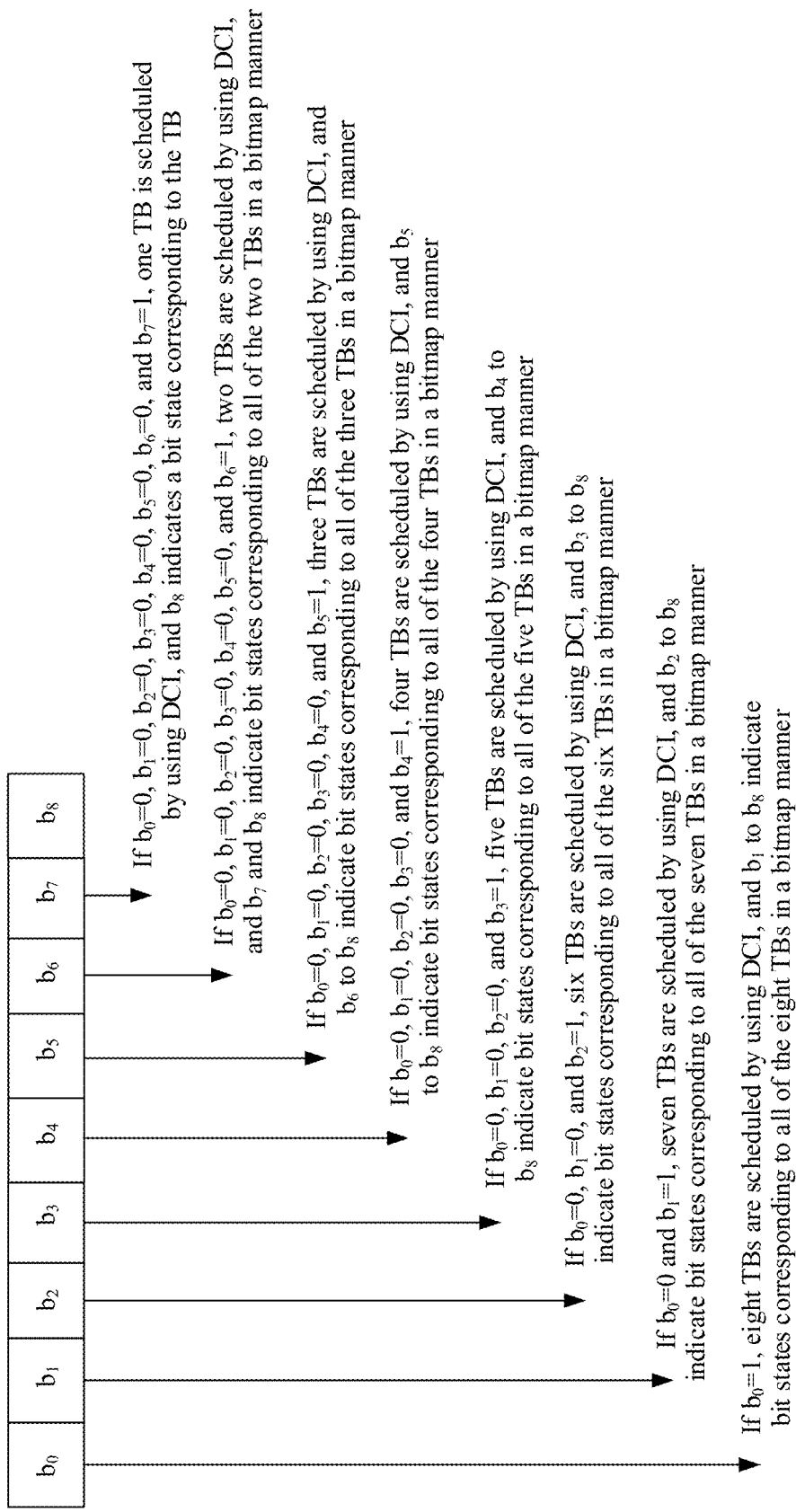
FIG. 5 is a schematic diagram of bit states indicated by 9 bits included in transport block allocation information according to an embodiment of this application.

FIG. 5 is a schematic diagram of bit states indicated by 9 bits included in transport block allocation information according to an embodiment of this application. Assuming that one piece of DCI can be used to schedule a maximum of K TBs, K+1 bits may be used to indicate the number of TBs scheduled by using the DCI and bit states corresponding to all of TBs scheduled by using the DCI. A total of K+1 bits from $b_0$ to $b_K$ indicates the number N of TBs scheduled by using the DCI and the bit states corresponding to all of the N TBs. N is a positive integer. For example, a value of N is 2 to K, or a value of N is 1 to K.

As shown in FIG. 5, K=8, a total of 9 bits from $b_0$ to $b_8$ indicates the number N of TBs scheduled by using the DCI and the bit states corresponding to all of the N TBs. N is a positive integer. For example, the value of N is 2 to 8, or the value of N is 1 to 8.

In the 9 bits from $b_0$ to $b_8$, from left to right ($b_0$ is a leftmost bit, and $b_8$ is a rightmost bit), a bit position of the left first bit that is 1 indicates the number of TBs scheduled by using the DCI.

For example, if $b_0=1$, it indicates that eight TBs are scheduled by using the DCI. In this case, a total of 8 bits from $b_1$ to $b_8$ indicates bit states corresponding to all of the eight TBs scheduled by using the DCI.

For example, if $b_1=1$, and a state of a bit on a left side of $b_1$ is 0, it indicates that seven TBs are scheduled by using the DCI. In this case, a total of 7 bits from $b_2$ to $b_8$ indicates bit states corresponding to all of the seven TBs scheduled by using the DCI.

For example, if $b_2=1$, and states of bits on a left side of $b_2$ are both 0, it indicates that six TBs are scheduled by using the DCI. In this case, a total of 6 bits from $b_3$ to $b_8$ indicates bit states corresponding to all of the six TBs scheduled by using the DCI.

For example, if $b_3=1$, and states of bits on a left side of $b_3$ are all 0, it indicates that five TBs are scheduled by using the DCI. In this case, a total of 5 bits from $b_4$ to $b_8$ indicates bit states corresponding to all of the five TBs scheduled by using the DCI.

For example, if $b_4=1$, and states of bits on a left side of $b_4$ are all 0, it indicates that four TBs are scheduled by using the DCI. In this case, a total of 4 bits from $b_5$ to $b_8$ indicates bit states corresponding to all of the four TBs scheduled by using the DCI.

For example, if $b_5=1$, and states of bits on a left side of $b_5$ are all 0, it indicates that three TBs are scheduled by using the DCI. In this case, a total of 3 bits from $b_6$ to $b_8$ indicates bit states corresponding to all of the three TBs scheduled by using the DCI.

For example, if $b_6=1$, and states of bits on a left side of $b_6$ are all 0, it indicates that two TBs are scheduled by using the DCI. In this case, a total of 2 bits that are $b_7$ and $b_8$ indicates bit states corresponding to both of the two TBs scheduled by using the DCI.

For example, if $b_7=1$, and states of bits on a left side of $b_7$ are all 0, it indicates that one TB is scheduled by using the DCI. In this case, the $b_8$ bit indicates a bit state corresponding to the TB scheduled by using the DCI.

As shown in the following Table 1, when K=8, the total of 9 bits from $b_0$ to $b_8$ indicates the number N of TBs scheduled by using the DCI and the bit states corresponding to all of the TBs.

TABLE 1

| Number of TB blocks | $b_0, b_1, b_2, b_3, b_4, b_5, b_6, b_7, b_8$ |
| --- | --- |
| 8 | $b_0 = 1, b_1, b_2, b_3, b_4, b_5, b_6, b_7, b_8$ |
| 7 | $b_0 = 0, b_1 = 1, b_2, b_3, b_4, b_5, b_6, b_7, b_8$ |
| 6 | $b_0 = 0, b_1 = 0, b_2 = 1, b_3, b_4, b_5, b_6, b_7, b_8$ |
| 5 | $b_0 = 0, b_1 = 0, b_2 = 0, b_3 = 1, b_4, b_5, b_6, b_7, b_8$ |
| 4 | $b_0 = 0, b_1 = 0, b_2 = 0, b_3 = 0, b_4 = 1, b_5, b_6, b_7, b_8$ |
| 3 | $b_0 = 0, b_1 = 0, b_2 = 0, b_3 = 0, b_4 = 0, b_5 = 1, b_6, b_7, b_8$ |
| 2 | $b_0 = 0, b_1 = 0, b_2 = 0, b_3 = 0, b_4 = 0, b_5 = 0, b_6 = 1, b_7, b_8$ |
| 1 | $b_0 = 0, b_1 = 0, b_2 = 0, b_3 = 0, b_4 = 0, b_5 = 0, b_6 = 0, b_7 = 1, b_8$ |

Optionally, as shown in Table 2, if states of bits on a left side of $b_7$ are all 0, it indicates that one TB is scheduled by using the DCI. In this case, $b_7$ and $b_8$ bits indicate a HARQ process number of the TB scheduled by using the DCI and a bit state corresponding to the TB. Table 3 provides an indication method.

As shown in the following Table 2, when K=8, the total of 9 bits from $b_0$ to $b_8$ indicates the number N of TBs scheduled by using the DCI and the bit states corresponding to all of the TBs.

TABLE 2

| Number of TB blocks | $b_0, b_1, b_2, b_3, b_4, b_5, b_6, b_7, b_8$ |
| --- | --- |
| 8 | $b_0 = 1, b_1, b_2, b_3, b_4, b_5, b_6, b_7, b_8$ |
| 7 | $b_0 = 0, b_1 = 1, b_2, b_3, b_4, b_5, b_6, b_7, b_8$ |

TABLE 2-continued

| Number of TB blocks | $b_0, b_1, b_2, b_3, b_4, b_5, b_6, b_7, b_8$ |
| --- | --- |
| 6 | $b_0 = 0, b_1 = 0, b_2 = 1, b_3, b_4, b_5, b_6, b_7, b_8$ |
| 5 | $b_0 = 0, b_1 = 0, b_2 = 0, b_3 = 1, b_4, b_5, b_6, b_7, b_8$ |
| 4 | $b_0 = 0, b_1 = 0, b_2 = 0, b_3 = 0, b_4 = 1, b_5, b_6, b_7, b_8$ |
| 3 | $b_0 = 0, b_1 = 0, b_2 = 0, b_3 = 0, b_4 = 0, b_5 = 1, b_6, b_7, b_8$ |
| 2 | $b_0 = 0, b_1 = 0, b_2 = 0, b_3 = 0, b_4 = 0, b_5 = 0, b_6 = 1, b_7, b_8$ |
| 1 | $b_0 = 0, b_1 = 0, b_2 = 0, b_3 = 0, b_4 = 0, b_5 = 0, b_6 = 0, b_7, b_8$ |

As shown in the following Table 3, when K=8, and $b_0=0$, $b_1=0$, $b_2=0$, $b_3=0$, $b_4=0$, $b_5=0$, and $b_6=0$, $b_7$ and $b_8$ indicate a HARQ process number of one TB and a state of the TB.

TABLE 3

| $b_7, b_8$ | HARQ process numbers of a TB | Bit state of the bit corresponding to the TB |
| --- | --- | --- |
| 00 | 0 | 0 |
| 01 | 0 | 1 |
| 10 | 1 | 0 |
| 11 | 1 | 1 |

Optionally, as shown in the following Table 4, if states of bits on a left side of $b_6$ are all 0, it indicates that two TBs are scheduled by using the DCI. In this case, a total of 3 bits that are $b_6$, $b_7$, and $b_8$ indicates HARQ process numbers of the two TBs scheduled by using the DCI and bit states corresponding to the two TBs. Table 5 provides an indication method.

TABLE 4

| Number of TB blocks | $b_0, b_1, b_2, b_3, b_4, b_5, b_6, b_7, b_8$ |
| --- | --- |
| 8 | $b_0 = 1, b_1, b_2, b_3, b_4, b_5, b_6, b_7, b_8$ |
| 7 | $b_0 = 0, b_1 = 1, b_2, b_3, b_4, b_5, b_6, b_7, b_8$ |
| 6 | $b_0 = 0, b_1 = 0, b_2 = 1, b_3, b_4, b_5, b_6, b_7, b_8$ |
| 5 | $b_0 = 0, b_1 = 0, b_2 = 0, b_3 = 1, b_4, b_5, b_6, b_7, b_8$ |
| 4 | $b_0 = 0, b_1 = 0, b_2 = 0, b_3 = 0, b_4 = 1, b_5, b_6, b_7, b_8$ |
| 3 | $b_0 = 0, b_1 = 0, b_2 = 0, b_3 = 0, b_4 = 0, b_5 = 1, b_6, b_7, b_8$ |
| 2 | $b_0 = 0, b_1 = 0, b_2 = 0, b_3 = 0, b_4 = 0, b_5 = 0, b_6, b_7, b_8$ |

As shown in the following Table 5, when K=8, and $b_0=0$, $b_1=0$, $b_2=0$, $b_3=0$, $b_4=0$, and $b_5=0$, $b_6$, $b_7$ and $b_8$ indicate HARQ process numbers of two TBs and bit states corresponding to the TBs.

TABLE 5

| $b_6, b_7, b_8$ | HARQ process numbers of {TB 1, TB 2} | Bit states of the bits corresponding to {TB 1, TB 2} |
| --- | --- | --- |
| 000 | {n0, n1} | {0, 0} |
| 001 | {n0, n1} | {0, 1} |
| 010 | {n0, n1} | {1, 0} |
| 011 | {n0, n1} | {1, 1} |
| 000 | {n2, n3} | {0, 0} |
| 001 | {n2, n3} | {0, 1} |
| 010 | {n2, n3} | {1, 0} |
| 011 | {n2, n3} | {1, 1} | n0 and n1 are positive integers. n2 and n3 are positive integers. For example, n0=0, n1=1, n2=2, and n3=3.

It should be noted that, the foregoing describes the method in the embodiments of this application by using an example in which a bit position of the left first bit that is 1 is used to indicate the number of TBs scheduled by using the DCI. Actually, some changes or replacements made to bit locations or bit states in the foregoing embodiments still fall within the protection scope of the embodiments of this application. For example, a bit position of the right first bit that is 1 in $b_0$ to $b_8$ is used to indicate the number of TBs scheduled by using the DCI. For example, a bit position of the left first bit that is 0 in $b_0$ to $b_8$ is used to indicate the number of TBs scheduled by using the DCI. For example, a bit position of the right first bit that is 0 in $b_0$ to $b_8$ is used to indicate the number of TBs scheduled by using the DCI.

Next, K=4 is used as an example for description. A total of 5 bits from $b_0$ to $b_4$ indicates the number N of TBs scheduled by using the DCI and the bit states corresponding to all of the N TBs. N is a positive integer. For example, the value of N is 2 to 4, or the value of N is 1 to 4. In the 5 bits from $b_0$ to $b_4$, from left to right ($b_0$ is a leftmost bit, and $b_4$ is a rightmost bit), a bit position of the left first bit that is 1 indicates the number of TBs scheduled by using the DCI.

For example, if $b_0=1$, it indicates that four TBs are scheduled by using the DCI. In this case, a total of 4 bits from $b_1$ to $b_4$ indicates bit states corresponding to all of the four TBs scheduled by using the DCI. For example, if $b_1=1$, and a state of a bit on a left side of $b_1$ is 0, it indicates that three TBs are scheduled by using the DCI. In this case, a total of 3 bits from $b_2$ to $b_4$ indicates bit states corresponding to all of the three TBs scheduled by using the DCI. For example, if $b_2=1$, and states of bits on a left side of $b_2$ are both 0, it indicates that two TBs are scheduled by using the DCI. In this case, a total of 2 bits from $b_3$ to $b_4$ indicates bit states corresponding to all of the two TBs scheduled by using the DCI. For example, if $b_3=1$, and states of bits on a left side of $b_3$ are all 0, it indicates that one TB is scheduled by using the DCI. In this case, $b_4$ indicates a bit state corresponding to the TB scheduled by using the DCI.

As shown in the following Table 6, when K=4, and $b_0=0$, $b_1=0$, and $b_2=0$, $b_3$ and $b_4$ are used to indicate a HARQ process number of one TB and a state of the TB.

TABLE 6

| Number of TB blocks | $b_0, b_1, b_2, b_3, b_4$ |
|---|---|
| 4 | $b_0 = 1, b_1, b_2, b_3, b_4$ |
| 3 | $b_0 = 0, b_1 = 1, b_2, b_3, b_4$ |
| 2 | $b_0 = 0, b_1 = 0, b_2 = 1, b_3, b_4$ |
| 1 | $b_0 = 0, b_1 = 0, b_2 = 0, b_3, b_4$ |

In Table 7, when K=4, $b_0=0$, $b_1=0$, and $b_2=0$, $b_3$ and $b_4$ indicate a HARQ process number of one TB and a state of the TB.

TABLE 7

| $b_3, b_4$ | HARQ process numbers of a TB | Bit state of the bit corresponding to the TB |
|---|---|---|
| 00 | 0 | 0 |
| 01 | 0 | 1 |
| 10 | 1 | 0 |
| 11 | 1 | 1 |

Optionally, as shown in the following Table 8, if states of bits on a left side of $b_2$ are both 0, it indicates that two TBs are scheduled by using the DCI. In this case, a total of 3 bits that are $b_2$, $b_3$, and $b_4$ indicates HARQ process numbers of the two TBs scheduled by using the DCI and bit states corresponding to the two TBs. Table 9 provides an indication method.

TABLE 8

| Number of TB blocks | $b_0, b_1, b_2, b_3, b_4$ |
|---|---|
| 4 | $b_0 = 1, b_1, b_2, b_3, b_4$ |
| 3 | $b_0 = 0, b_1 = 1, b_2, b_3, b_4$ |
| 2 | $b_0 = 0, b_1 = 0, b_2, b_3, b_4$ |

In Table 9, when K=4, and $b_0=0$ and $b_{1=0}$, $b_2$, $b_3$, and $b_4$ indicate HARQ process numbers of two TBs and bit states corresponding to the TBs.

TABLE 9

| $b_2, b_3, b_4$ | HARQ process numbers of {TB 1, TB 2} | Bit states of the bits corresponding to {TB 1, TB 2} |
|---|---|---|
| 000 | {n0, n1} | {0, 0} |
| 001 | {n0, n1} | {0, 1} |
| 010 | {n0, n1} | {1, 0} |
| 011 | {n0, n1} | {1, 1} |
| 000 | {n2, n3} | {0, 0} |
| 001 | {n2, n3} | {0, 1} |
| 010 | {n2, n3} | {1, 0} |
| 011 | {n2, n3} | {1, 1} | n0 and n1 are positive integers. n2 and n3 are positive integers. For example, n0=0, n1=1, n2=2, and n3=3.

Figure 6:
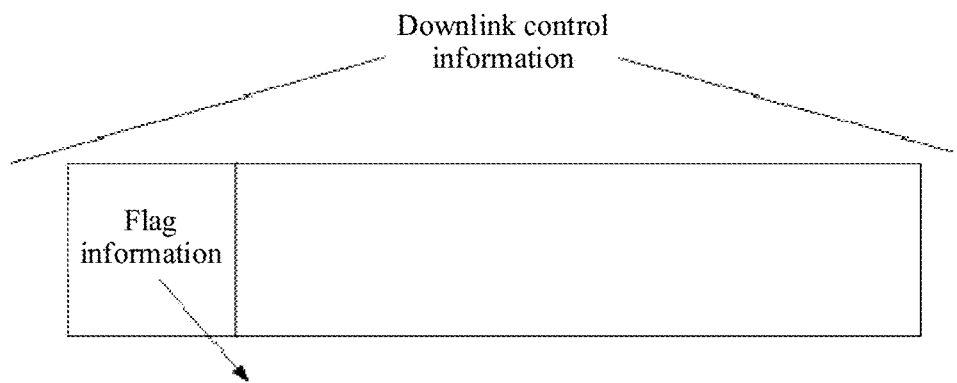
FIG. 6 is a schematic diagram in which downlink control information carries flag information according to an embodiment of this application.

FIG. 6 is a schematic diagram in which downlink control information carries flag information according to an embodiment of this application. The flag information may be the flag information in the downlink control information. The flag information indicates that the downlink control information is used for scheduling of a plurality of TBs. When the flag information indicates that the downlink control information is used for scheduling of a plurality of TBs, the flag information may further indicate processing to be performed by the UE on the plurality of TBs scheduled by using the downlink control information. Further, the flag information may alternatively indicate that the downlink control information is used for scheduling of a single TB.

For example, the flag information includes 2 bits, and the 2 bits indicate one or more of a first function, a second function, a third function, or a fourth function.

First function: One piece of DCI indicates transmission of a plurality of TBs. If the base station indicates that a bit state of a TB is 0, the TB is a newly transmitted TB, and the UE transmits the newly transmitted TB; or if the base station indicates that a bit state of a TB is 1, the TB is a retransmitted TB, and the UE transmits the retransmitted TB. Optionally, a first bit structure is used for the DCI, and the UE interprets bit information of the DCI based on the first bit structure.

Second function: One piece of DCI indicates transmission of a plurality of TBs. If the base station indicates that a bit state of a TB is 0, the TB is a newly transmitted TB, and the UE transmits the newly transmitted TB; or if the base station indicates that a bit state of a TB is 1, the base station indicates the UE not to transmit the TB or to ignore the TB indicated by the base station. Optionally, the TB may be a retransmitted TB and/or an unscheduled TB. Optionally, a first bit structure is used for the DCI, and the UE interprets bit information of the DCI based on the first bit structure.

Third function: One piece of DCI indicates transmission of a plurality of TBs. If the base station indicates that a bit state of a TB is 1, the TB is a retransmitted TB, and the UE transmits the retransmitted TB; or if the base station indicates that a bit state of a TB is 0, the base station indicates the UE not to transmit the TB or to ignore the TB indicated by the base station. Optionally, the TB may be a newly transmitted TB and/or an unscheduled TB. Optionally, a first bit structure is used for the DCI, and the UE interprets bit information of the DCI based on the first bit structure.

Fourth function: One piece of DCI schedules transmission of only one TB. Optionally, a second bit structure is used for the DCI, and the UE interprets bit information of the DCI based on the second bit structure.

As shown in the following Table 10, 2 bits are used to illustrate that flag information in DCI indicates the first function, the second function, the third function, or the fourth function, and a DCI bit structure. Optionally, the bit structure may be implicitly obtained based on a function. For example, the first function, the second function, and the third function all correspond to the first bit structure. For example, the fourth function corresponds to the second bit structure. Therefore, indicating, by the base station, a DCI function is equivalent to indicating a DCI bit structure.

TABLE 10

| Bit state | DCI function | DCI bit structure |
| --- | --- | --- |
| 00 | First function | First bit structure |
| 01 | Second function | First bit structure |
| 10 | Third function | First bit structure |
| 11 | Fourth function | Second bit structure |

As shown in the following Table 11, 2 bits are used to indicate the first function, the second function, the third function, and the fourth function.

TABLE 11

| Bit state | DCI function | DCI bit structure |
| --- | --- | --- |
| 00 | Fourth function | Second bit structure |
| 01 | First function | First bit structure |
| 10 | Second function: | First bit structure |
| 11 | Third function | First bit structure |

Figure 7A:
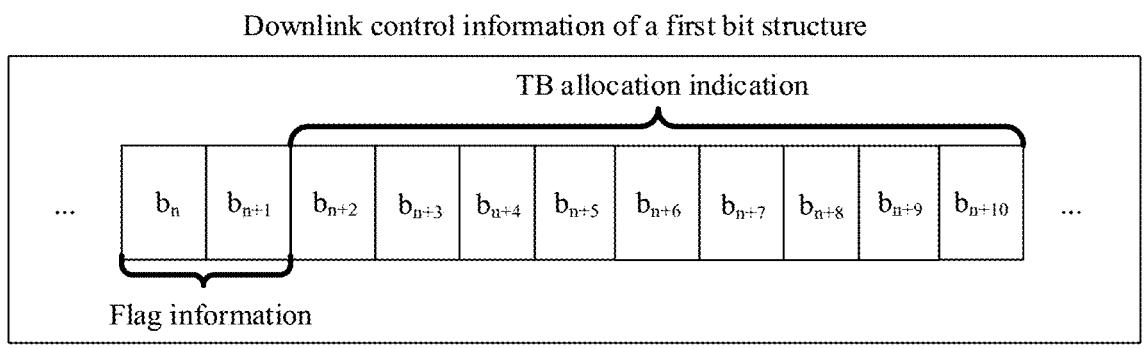
FIG. 7A is a schematic diagram of a bit structure indicated by flag information according to an embodiment of this application.

In downlink control information of the first bit structure, the DCI includes flag information, and the DCI further includes TB allocation indication information or TB scheduling indication information. For example, the TB allocation indication information or the TB scheduling indication information includes 8 to 10 bits. The DCI may be used to simultaneously schedule a plurality of TB blocks. FIG. 7A is a schematic diagram of a bit structure indicated by flag information according to an embodiment of this application, and shows downlink control information of the first bit structure, where TB allocation indication information or TB scheduling indication information includes 9 bits, corresponding to the foregoing $b_0$ to $b_8$ bits.

Figure 7B:
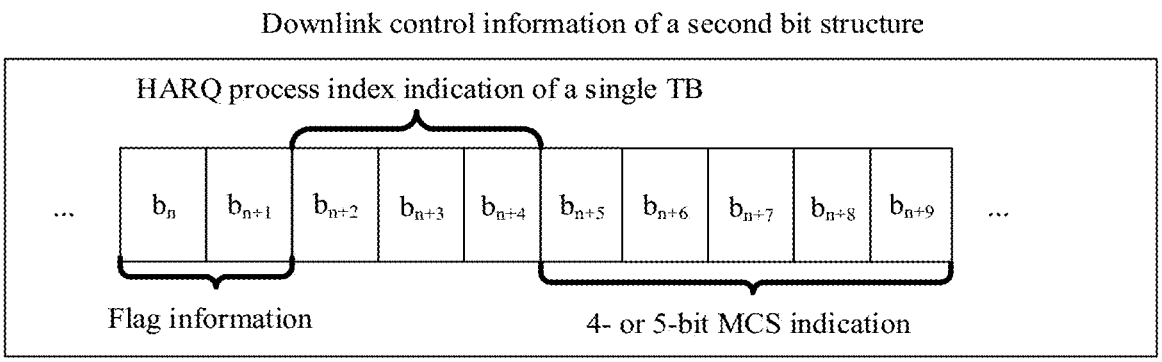
FIG. 7B is a schematic diagram of another bit structure indicated by flag information according to an embodiment of this application.

FIG. 7B is a schematic diagram of another bit structure indicated by flag information according to an embodiment of this application. In downlink control information of the second bit structure, DCI includes flag information, the DCI is used to schedule only one TB block, and the DCI further includes HARQ process number indication information of the TB. FIG. 7B shows downlink control information of the second bit structure, where 3 bits are used to indicate a HARQ process number of a single TB scheduled by using the DCI.

Figure 8A:
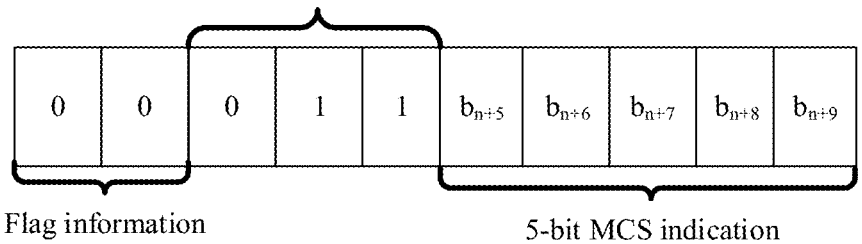
FIG. 8A is a schematic diagram of a function indicated by flag information according to an embodiment of this application.

FIG. 8A is a schematic diagram of a function indicated by flag information according to an embodiment of this application. The flag information is 00 and indicates the fourth function. Therefore, one TB block is scheduled by using DCI. In addition, the DCI indicates that a HARQ index of the TB is 3. In the DCI, 5 bits are further used to indicate a modulation and coding scheme (MCS).

Figure 8B:
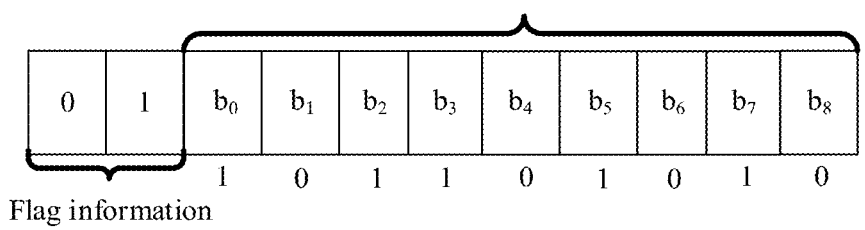
FIG. 8B is a schematic diagram of another function indicated by flag information according to an embodiment of this application.

FIG. 8B is a schematic diagram of another function indicated by flag information according to an embodiment of this application. The flag information is 01 and indicates the first function, and $b_0=1$. Therefore, DCI indicates eight TB blocks. $b_1$ to $b_8$ indicate, in a bitmap manner, bit states of bits corresponding to all of the eight TBs. If a state of a bit in $b_1$ to $b_8$ is 0, it indicates that a TB corresponding to the bit is newly transmitted. If a state of a bit in $b_1$ to $b_8$ is 1, it indicates that a TB corresponding to the bit is retransmitted. As shown in FIG. 8B, a TB 1, a TB 4, a TB 6, and a TB 8 are newly transmitted TBs, and a TB 2, a TB 3, a TB 5, and a TB 7 are retransmitted TBs.

Figure 8C:
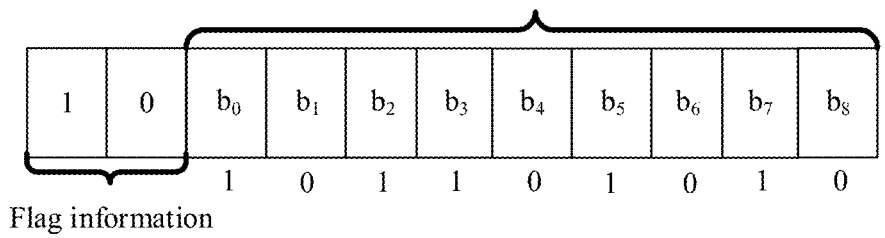
FIG. 8C is a schematic diagram of another function indicated by flag information according to an embodiment of this application.

FIG. 8C is a schematic diagram of another function indicated by flag information according to an embodiment of this application. The flag information is 10 and indicates the second function, and $b_0=1$. Therefore, DCI indicates eight TB blocks. $b_1$ to $b_8$ indicate, in a bitmap manner, bit states of bits corresponding to all of the eight TBs. If a state of a bit in $b_1$ to $b_8$ is 0, it indicates that a TB corresponding to the bit is newly transmitted. If a state of a bit in $b_1$ to $b_8$ is 1, it indicates that the UE does not transmit or ignores a TB corresponding to the bit. As shown in FIG. 8C, the UE newly transmits only a TB 1, a TB 4, a TB 6, and a TB 8, and the UE does not transmit or ignores a TB 2, a TB 3, a TB 5, and a TB 7.

Figure 8D:
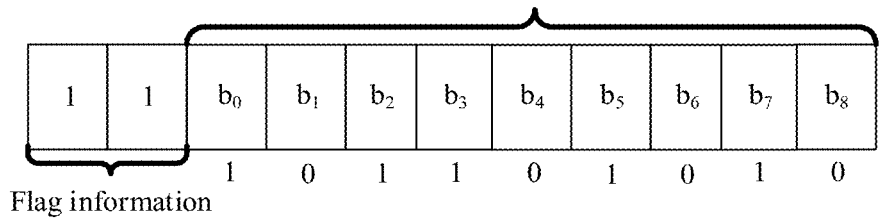
FIG. 8D is a schematic diagram of another function indicated by flag information according to an embodiment of this application.

FIG. 8D is a schematic diagram of another function indicated by flag information according to an embodiment of this application. The flag information is 11 and indicates the third function, and $b_0=1$. Therefore, DCI indicates eight TB blocks. $b_1$ to $b_8$ indicate, in a bitmap manner, bit states of bits corresponding to all of the eight TBs. If a state of a bit in $b_1$ to $b_8$ is 1, it indicates that a TB corresponding to the bit is retransmitted. If a state of a bit in $b_1$ to $b_8$ is 0, it indicates that the UE does not transmit or ignores a TB corresponding to the bit. As shown in FIG. 8D, the UE retransmits only a TB 2, a TB 3, a TB 5, and a TB 7, and the UE does not transmit or ignores a TBb 1, a TB 4, a TB 6, and a TB 8.

The following provides an indication method used when one piece of DCI can be used to schedule a maximum of two TB blocks. As shown in the following Table 12, 3 bits are used to indicate whether one TB is scheduled or two TBs are scheduled by using the DCI, and indicate whether the scheduled TB/the scheduled TBs is/are newly transmitted or retransmitted.

The first communications device generates the flag information. The flag information includes 3 bits, and different bit states of the flag information are associated with different TB indications.

TABLE 12

| Bit state | TB indication |
| --- | --- |
| 000 | TB 0, newly transmitted |
| 001 | TB 1, newly transmitted |
| 010 | TB 0, retransmitted |
| 011 | TB 1, retransmitted |
| 100 | TB 0, newly transmitted; and TB 1, newly transmitted |
| 101 | TB 0, newly transmitted; and TB 1, retransmitted |
| 110 | TB 0, retransmitted; and TB 1, newly transmitted |
| 111 | TB 0, retransmitted; and TB 1, retransmitted |

Figure 9:
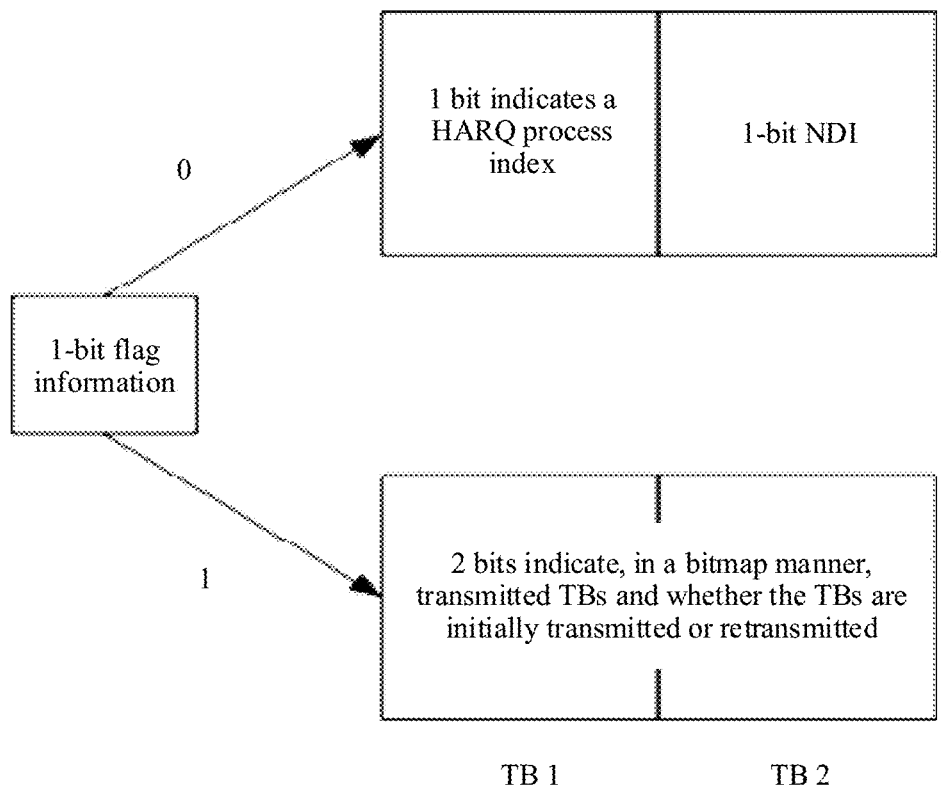
FIG. 9 is a schematic diagram in which a 3-bit indication manner is used in DCI according to an embodiment of this application.

FIG. 9 is a schematic diagram in which a 3-bit indication manner is used in DCI according to an embodiment of this application. When one piece of DCI can be used to schedule a maximum of two TB blocks, 1 bit in the DCI indicates whether the DCI is used for scheduling of one TB or scheduling of two TBs.

When 1 bit in the DCI indicates that the DCI is used for scheduling of one TB, 1 bit in the DCI indicates a HARQ process number of the transmitted TB, and 1 bit in the DCI indicates a new data indicator (NDI). The new data indicator may indicate whether the TB is initially transmitted or retransmitted.

When 1 bit in the DCI indicates that the DCI is used for scheduling of two TBs, 2 bits in the DCI indicate, in a bitmap manner, the transmitted TBs and whether the TBs are initially transmitted or retransmitted.

In the embodiments of this application, the DCI can support scheduling of a plurality of TBs with a few bits, thereby improving scheduling flexibility and resource efficiency.

It should be noted that, for brief description, the foregoing method embodiments are represented as a combination of a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments, and the involved actions and modules are not necessarily required by this application.

To better implement the foregoing solutions in the embodiments of this application, the following further provides related apparatuses configured to implement the foregoing solutions.

Figure 10:
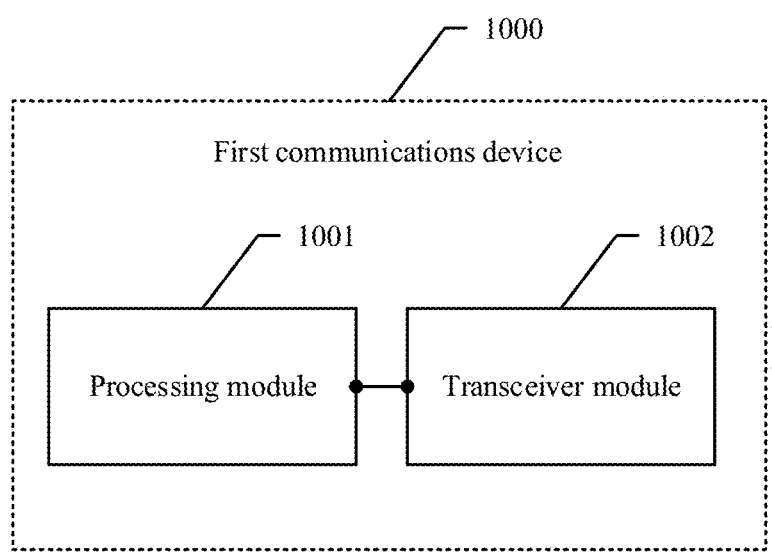
FIG. 10 is a schematic diagram of a composition structure of a first communications device according to an embodiment of this application.

FIG. 10 is a schematic diagram of a composition structure of a first communications device 1000 according to an embodiment of this application. The first communications device 1000 includes a processing module 1001 and a transceiver module 1002.

The processing module 1001 is configured to obtain, by using the transceiver module 1002, flag information sent by a second communications device.

The processing module 1001 is further configured to: when the flag information indicates that one piece of control information can be used for scheduling of a plurality of transport blocks, obtain, by using the transceiver module 1002, transport block allocation information sent by the second communications device, where the transport block allocation information indicates the number N of transport blocks scheduled by using the control information and a bit state corresponding to each transport block; and send data to the second communications device based on the flag information and the bit state corresponding to each transport block and by using the transceiver module 1002 and at least one transport block indicated by the control information, or receive, based on the flag information and the bit state corresponding to each transport block and by using the transceiver module 1002 and at least one transport block indicated by the control information, data sent by the second communications device, where the at least one transport block belongs to the N transport blocks; or the processing module 1001 is further configured to: when the flag information indicates that one piece of control information can be used for scheduling of only one transport block, obtain, by using the transceiver module 1002, hybrid automatic repeat request HARQ process number information sent by the second communications device, where the HARQ process number information indicates a HARQ process number corresponding to the transport block scheduled by using the control information; and send data to the second communications device based on the flag information and the HARQ process number corresponding to the transport block and by using the transceiver module 1002, or receive, based on the flag information and the HARQ process number corresponding to the transport block and by using the transceiver module 1002, data sent by the second communications device.

In some embodiments of this application, the processing module 1001 is configured to receive, by using the transceiver module 1002, control information sent by the second communications device, where the control information includes the flag information; or receive, by using the transceiver module 1002, higher layer signaling sent by the second communications device, where the higher layer signaling includes the flag information.

Figure 11:
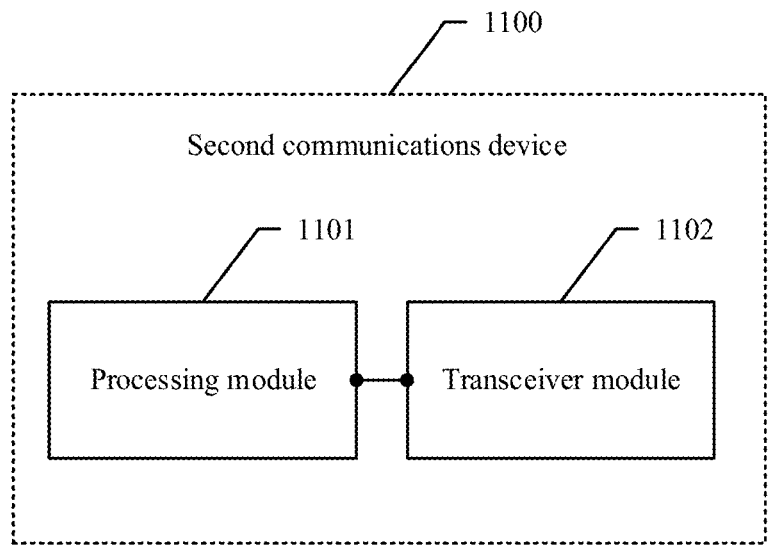
FIG. 11 is a schematic diagram of a composition structure of a second communications device according to an embodiment of this application.

FIG. 11 is a schematic diagram of a composition structure of a second communications device 1100 according to an embodiment of this application. The second communications device 1100 includes a processing module 1101 and a transceiver module 1102.

The processing module 1101 is configured to generate flag information, where the flag information is used to indicate that one piece of control information can be used for scheduling of a plurality of transport blocks, or that one piece of control information can be used for scheduling of only one transport block.

The processing module 1101 is further configured to: when the flag information indicates that one piece of control information can be used for scheduling of a plurality of transport blocks, send the flag information and transport block allocation information to the first communications device by using the transceiver module 1102, where the transport block allocation information indicates the number N of transport blocks scheduled by using the control information and a bit state corresponding to each transport block; and send data to the first communications device based on the bit state corresponding to each transport block and by using the transceiver module 1102 and at least one transport block indicated by the control information, or receive, based on the bit state corresponding to each transport block and by using the transceiver module 1102 and at least one transport block indicated by the control information, data sent by the first communications device, where the at least one transport block belongs to the N transport blocks; or the processing module 1101 is further configured to: when the flag information indicates that one piece of control information can be used for scheduling of only one transport block, send the flag information and hybrid automatic repeat request HARQ process number information to the first communications device by using the transceiver module 1102, where the HARQ process number information indicates a HARQ process number corresponding to the transport block scheduled by using the control information; and send data to the first communications device based on the HARQ process number corresponding to the transport block and by using the transceiver module 1102, or receive, based on the HARQ process number corresponding to the transport block and by using the transceiver module 1102, data sent by the first communications device.

In some embodiments of this application, the processing module 1101 is configured to send control information to the first communications device by using the transceiver module 1102, where the control information includes the flag information; or send higher layer signaling to the first communications device by using the transceiver module 1102, where the higher layer signaling includes the flag information.

In some embodiments of this application, when the flag information indicates that one piece of control information can be used for scheduling of a plurality of transport blocks, the control information includes the transport block allocation information; or When the flag information indicates that one piece of control information can be used for scheduling of only one transport block, the control information includes the HARQ process number information.

In some embodiments of this application, the transport block allocation information includes M bits, the M bits are $b_0, b_1, \ldots,$ and $b_{(M-1)}$, $b_0$ is a leftmost bit of the M bits, and $b_{(M-1)}$ is a rightmost bit of the M bits; and if a $(j+1)^{th}$ bit of the M bits is $b_j$, $b_j=1$, and states of all bits on a left side of $b_j$ are 0 in the M bits, (K−j) TBs are scheduled by using the control information; or if a $(c+1)^{th}$ bit of the M bits is $b_c$, $b_c=0$, and states of all bits on a left side of $b_c$ are 0 in the M bits, (K−c) TBs are scheduled by using the control information, where M is a positive integer, K is positive integer, and K is less than M;

j is an integer, and j is equal to any one of the following values: 0, 1, 2, . . . , and (M−1); and c is an integer, and c is equal to any one of the following values: 0, 1, 2, . . . , and (M−1).

In some embodiments of this application, each of (K−j) bits on a right side of $b_j$ is associated with one TB.

In some embodiments of this application, that each of (K−j) bits on a right side of $b_j$ is associated with one TB includes:

a $p^{th}$ bit of the (K−j) bits on the right side of $b_j$ is associated with a $p^{th}$ TB indicated by the control information, where p is an integer, and p is equal to any one of the following values: 1, 2, . . . , and (K−j).

In some embodiments of this application, that a $p^{th}$ bit of the (K−j) bits on the right side of $b_j$ is associated with a $p^{th}$ TB indicated by the control information includes:

a bit state of the $p^{th}$ bit of the (K−j) bits on the right side of $b_j$ is a bit state corresponding to the $p^{th}$ TB.

In some embodiments of this application, M=9 and K=8; and/or

M=5 and K=4; and/or c=6 or 7; and/or c=2 or 3.

In some embodiments of this application, the flag information includes X bits, and X is a positive integer; and one of bit states of the X bits of the flag information indicates that the control information can be used for scheduling of a plurality of transport blocks, the control information includes the transport block allocation information, an $i^{th}$ TB of the N transport blocks TBs is $TB_i$, and $TB_i$ is a newly transmitted TB if a bit state corresponding to $TB_i$ is 0, or $TB_i$ is a retransmitted TB if a bit state corresponding to $TB_i$ is 1; and/or one of bit states of the X bits of the flag information indicates that the control information can be used for scheduling of a plurality of transport blocks, the control information includes the transport block allocation information, an $i^{th}$ TB of the N TBs is $TB_i$, and $TB_i$ is a newly transmitted TB if a bit state corresponding to $TB_i$ is 0, or the first communications device does not transmit $TB_i$ or ignores $TB_i$ if a bit state corresponding to $TB_i$ is 1; and/or one of bit states of the X bits of the flag information indicates that the control information can be used for scheduling of a plurality of transport blocks, the control information includes the transport block allocation information, an $i^{th}$ TB of the N TBs is $TB_i$, and $TB_i$ is a retransmitted TB if a bit state corresponding to $TB_i$ is 1, or the first communications device does not transmit $TB_i$ or ignores $TB_i$ if a bit state corresponding to $TB_i$ is 0; and/or one of bit states of the X bits of the flag information indicates that the control information can be used for scheduling of only one transport block, where N is a positive integer, i is an integer, and i is equal to any one of the following values: 1, 2, . . . , and N, or 0, 1, . . . , and (N−1).

In some embodiments of this application, the processing module included in the second communications device is specifically configured to: send the data to the first communications device based on the bit states of the X bits of the flag information and the bit state corresponding to each transport block and by using the transceiver module included in the second communications device and the at least one transport block indicated by the control information, or receive, based on the bit states of the X bits of the flag information and the bit state corresponding to each transport block and by using the transceiver module included in the second communications device and the at least one transport block indicated by the control information, the data sent by the first communications device.

In some embodiments of this application, X=2; and/or a value of N is 1, 2, . . . , or 8; or a value of N is 2, . . . , or 8; or a value of N is 1, 2, 3, or 4; or a value of N is 2, 3, or 4.

It may be learned from the foregoing example descriptions that, in the embodiments of this application, to enable the first communications device to obtain the number of transport blocks that is determined by the second communications device, the second communications device may generate the flag information and send the flag information to the first communications device, so that the first communications device can obtain, based on the received flag information, the number of transport blocks that is determined by the second communications device. To reduce indication overheads of the control information, in the embodiments of this application, the flag information generated by the second communications device may be used to indicate that one piece of control information can be used for scheduling of a plurality of transport blocks, or that one piece of control information can be used for scheduling of only one transport block. When the flag information indicates a plurality of transport blocks, the second communications device further sends the transport block allocation information; or when the flag information indicates one transport block, the second communications device further sends the HARQ process number information. In the embodiments of this application, bit overheads of the control information can be optimized, thereby improving transmission performance of the control information.

It should be noted that content such as information exchange between the modules/units of the apparatus and the execution processes thereof is based on the same idea as the method embodiments of this application, and therefore brings the same technical effects as the method embodiments of this application. For the specific content, refer to the foregoing descriptions in the method embodiments of this application. The details are not described herein again.

An embodiment of this application further provides a computer storage medium. The computer storage medium stores a program, and execution of the program includes some or all of the steps described in the foregoing method embodiments.

Figure 12:
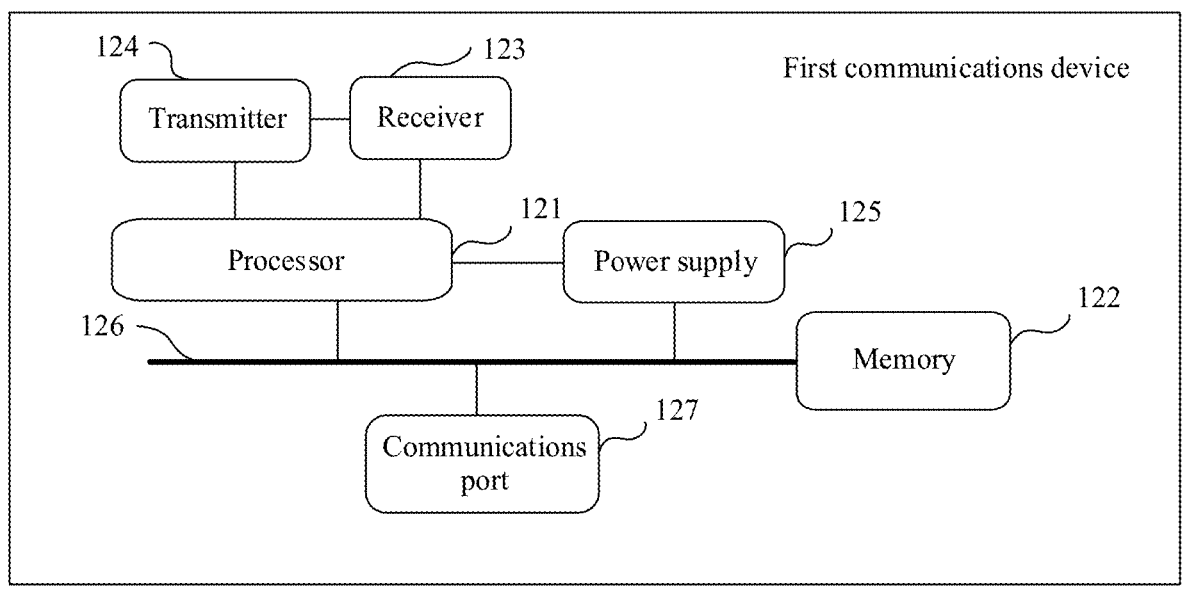
FIG. 12 is a schematic diagram of a composition structure of another first communications device according to an embodiment of this application.

FIG. 12 is a schematic structural diagram of another device according to an embodiment of this application. The device is a first communications device. The first communications device may include a processor (for example, a CPU) 121, a memory 122, a transmitter 124, and a receiver 123. The transmitter 124 and the receiver 123 are coupled to the processor 121. The processor 121 controls a sending action of the transmitter 124 and a receiving action of the receiver 123. The memory 122 may include a high-speed RAM, or may include a nonvolatile memory NVM, for example, at least one magnetic disk memory. The memory 122 may store various instructions, to complete various processing functions and implement the steps of the method in the embodiments of this application. Optionally, the first communications device in this embodiment of this application may further include one or more of a power supply 125, a communications bus 126, or a communications port 127. The receiver 123 and the transmitter 124 may be integrated into a transceiver of the first communications device, or may be respectively independent receive and transmit antennas in the first communications device. The communications bus 126 is configured to implement communication and connection between components. The communications port 127 is configured to implement connection and communication between the first communications device and another external device.

In this embodiment of this application, the memory 122 is configured to store computer-executable program code. The program code includes an instruction. When the processor 121 executes the instruction, the instruction enables the processor 121 to execute the processing actions of the first communications device in the foregoing method embodiments, and enables the transmitter 124 to execute the sending action of the first communications device in the foregoing method embodiments. Implementation principles and technical effects thereof are similar. Details are not described herein again.

Figure 13:
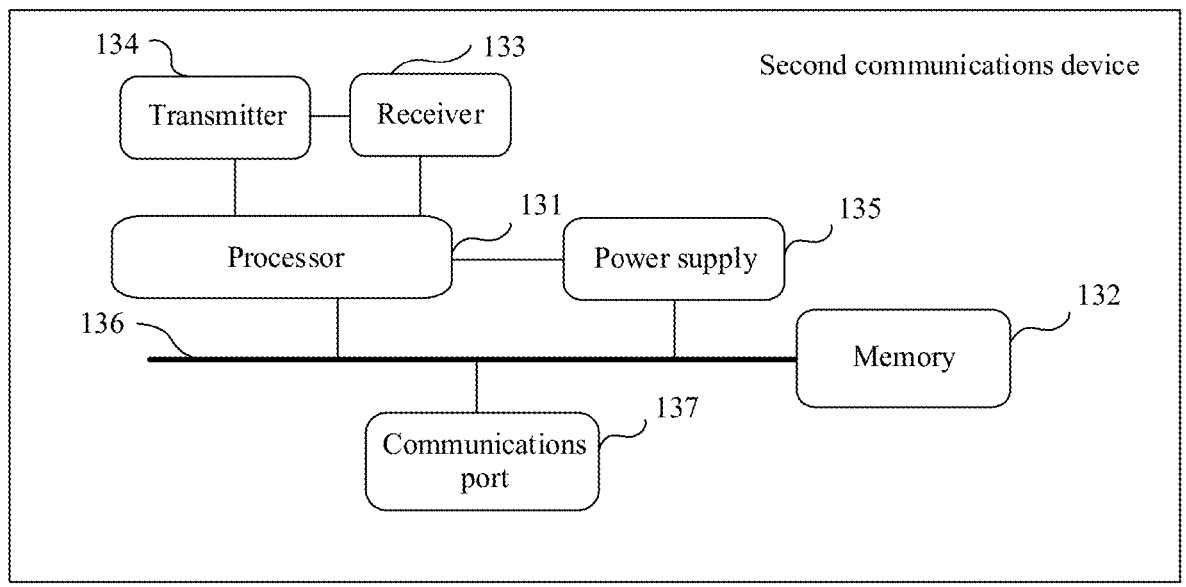
FIG. 13 is a schematic diagram of a composition structure of another second communications device according to an embodiment of this application.

FIG. 13 is a schematic structural diagram of another device according to an embodiment of this application. The device is a second communications device. The second communications device may include a processor (for example, a CPU) 131, a memory 132, a receiver 133, and a transmitter 134. The receiver 133 and the transmitter 134 are coupled to the processor 131. The processor 131 controls a receiving action of the receiver 133 and a sending action of the transmitter 134. The memory 132 may include a high-speed RAM, or may include a nonvolatile memory NVM, for example, at least one magnetic disk memory. The memory 132 may store various instructions, to complete various processing functions and implement the steps of the method in the embodiments of this application. Optionally, the second communications device in this embodiment of this application may further include one or more of a power supply 135, a communications bus 136, or a communications port 137. The receiver 133 and the transmitter 134 may be integrated into a transceiver of the second communications device, or may be respectively independent receive and transmit antennas in the second communications device. The communications bus 136 is configured to implement communication and connection between components. The communications port 137 is configured to implement connection and communication between the second network device and another external device.

In another possible design, when the communications device is a chip in a terminal device or a network device, the chip includes a processing unit and a communications unit. The processing unit may be, for example, a processor, and the communications unit may be, for example, an input/output interface, a pin, or a circuit. The processing unit may execute a computer-executable instruction stored in a storage unit, to enable the chip in the terminal to execute the wireless communication method according to any one of the foregoing embodiments. Optionally, the storage unit is a storage unit in the chip, for example, a register or a buffer; or the storage unit may be alternatively a storage unit outside the chip and in the terminal, for example, a read-only memory (ROM), another type of static storage device that can store static information and an instruction, or a random access memory (RAM).

Any processor described above may be a general-purpose central processing unit (CPU), a microprocessor, an application-specific integrated circuit (ASIC), or one or more integrated circuits configured to control program execution of the wireless communication method according to any one of the foregoing embodiments.

In addition, it should be noted that the described apparatus embodiment is merely an example. The units described as separate parts may or may not be physically separate, and parts displayed as units may or may not be physical units, that is, may be located in one place, or may be distributed on a plurality of network units. Some or all the modules may be selected according to actual needs to achieve the objectives of the solutions of the embodiments. In addition, in the accompanying drawings of the apparatus embodiments provided in this application, connection relationships between modules indicate communication and connection between the modules, which may be specifically implemented as one or more communications buses or signal cables. A person of ordinary skill in the art may understand and implement the embodiments of this application without creative efforts.

Based on the description of the foregoing implementations, a person skilled in the art may clearly understand that this application may be implemented by using software in combination with necessary universal hardware, or certainly, may be implemented by using dedicated hardware, including a dedicated integrated circuit, a dedicated CPU, a dedicated memory, a dedicated component, or the like. Generally, any function that can be completed by using a computer program can be very easily implemented by using corresponding hardware. Moreover, a specific hardware structure used to implement a same function may be in various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A data transmission method, comprising: receiving, by a first communications device, flag information from a second communications device; and
in response to the flag information indicating that one piece of control information is able to be used for scheduling of a plurality of transport blocks:
obtaining, by the first communications device, transport block allocation information from the second communications device, wherein the transport block allocation information indicates a number N of transport blocks scheduled by the one piece of control information and a bit state corresponding to each transport block of the number N of transport blocks; and
performing one or more of:
(i) sending, by the first communications device, data to the second communications device based on the flag information and the bit state corresponding to each transport block of the number N of transport blocks and by using at least one transport block indicated by the control information, wherein N is a positive integer, or
(ii) receiving, based on the flag information and the bit state corresponding to each transport block of the number N of transport blocks and by using at least one transport block indicated by the one piece of control information, data from the second communications device,
wherein the at least one transport block belongs to the N transport blocks; and in response to the flag information indicating that one piece of control information is able to be used for scheduling of only one transport block:
obtaining, by the first communications device, hybrid automatic repeat request (HARQ) process number information from the second communications device, wherein the HARQ process number information indicates an HARQ process number corresponding to the only one transport block scheduled by using the one piece of control information; and
performing one or more of:
(i) sending, by the first communications device, data to the second communications device based on the flag information and the HARQ process number corresponding to the only one transport block, or
(ii) receiving, based on the flag information and the HARQ process number corresponding to the only one transport block, data from the second communications device.

2. The method according to claim 1, wherein:
the transport block allocation information comprises M bits, the M bits are $b_0, b_1, \ldots,$ and $b_{(M-1)}$, $b_0$ is a leftmost bit of the M bits, and $b_{(M-1)}$ is a rightmost bit of the M bits; and
in response to a $(j+1)^{th}$ bit of the M bits being $b_j$, $b_j=1$, and states of all bits on a left side of $b_j$ are 0 in the M bits, (K−j) transport blocks are scheduled by using the one piece of control information; or
in response to a $(c+1)^{th}$ bit in the M bits being $b_c$, $b_c=0$, and states of all bits on a left side of $b_c$ are 0 in the M bits, (K−c) transport blocks are scheduled by using the one piece of control information,
wherein M is a positive integer, K is a positive integer, and K is less than M;
wherein j is an integer, and j is equal to any one of the following values: 0, 1, 2, . . . , and (M−1); and
wherein c is an integer, and c is equal to any one of the following values: 0, 1, 2, . . . , and (M−1).

3. The method according to claim 2, wherein each of (K−j) bits on a right side of $b_j$ is associated with one transport block.

4. The method according to claim 3, wherein that each of (K−j) bits on the right side of $b_j$ is associated with one transport block comprises:
a $p^{th}$ bit of the (K−j) bits on the right side of $b_j$ is associated with a $p^{th}$ transport block indicated by the one piece of control information,
wherein p is an integer, and p is equal to any one of the following values: 1, 2, . . . , and (K−j).

5. The method according to claim 4, wherein a bit state of the $p^{th}$ bit of the (K−j) bits on the right side of $b_j$ is a bit state corresponding to the $p^{th}$ transport block.

6. A first communications device, comprising:
a transceiver;
at least one processor; and
at least one memory storing program codes, wherein the program codes being executed by the at least one processor cause the at least one processor to:
receive, by using the transceiver, flag information from a second communications device; and
in response to the flag information indicating that one piece of control information is able to be used for scheduling of a plurality of transport blocks:
obtain, by using the transceiver, transport block allocation information from the second communications device, wherein the transport block allocation information indicates a number N of transport blocks scheduled by using the one piece of control information and a bit state corresponding to each transport block of the number N of transport blocks, wherein N is a positive integer; and
perform one or more of:
(i) send, by using the transceiver, based on the flag information and the bit state corresponding to each transport block of the number N of transport blocks and at least one transport block indicated by the one piece of control information, data to the second communications device, or (ii) receive, by using the transceiver, based on the flag information and the bit state corresponding to each transport block of the number N of transport blocks and at least one transport block indicated by the one piece of control information, data from the second communications device, wherein the at least one transport block belongs to the N transport blocks; and in response to the flag information indicating that one piece of control information is able to be used for scheduling of only one transport block:

obtain, by using the transceiver, hybrid automatic repeat request (HARQ) process number information from the second communications device, wherein the HARQ process number information indicates an HARQ process number corresponding to the transport block scheduled by the one piece of control information; and perform one or more of:
(i) send, by using the transceiver, data to the second communications device based on the flag information and the HARQ process number corresponding to the only one transport block, or
(ii) receive, by using the transceiver, based on the flag information and the HARQ process number corresponding to the only one transport block, data from the second communications device.

7. The first communications device according to claim 6, wherein:

the transport block allocation information comprises M bits, the M bits are $b_0$, $b_1$, ..., and $b_{(M-1)}$, $b_0$ is a leftmost bit of the M bits, and $b_{(M-1)}$ is a rightmost bit of the M bits; and in response to a $(j+1)^{th}$ bit of the M bits being $b_j$, $b_j=1$, and states of all bits on a left side of $b_j$ are 0 in the M bits, (K−j) transport blocks are scheduled by using the one piece of control information; or in response to a $(c+1)^{th}$ bit in the M bits being $b_c$, $b_c=0$, and states of all bits on a left side of $b_c$ are 0 in the M bits, (K−c) transport blocks are scheduled by using the one piece of control information, wherein M is a positive integer, K is a positive integer, and K is less than M;

wherein j is an integer, and j is equal to any one of the following values: 0, 1, 2, ..., and (M−1); and wherein c is an integer, and c is equal to any one of the following values: 0, 1, 2, ..., and (M−1).

8. The first communications device according to claim 7, wherein a $p^{th}$ bit of the (K−j) bits on a right side of $b_j$ is associated with a $p^{th}$ transport block indicated by the one piece of control information, wherein p is an integer, and p is equal to any one of the following values: 1, 2, ..., and (K−j).

9. The first communications device according to claim 8, wherein a bit state of the $p^{th}$ bit of the (K−j) bits on the right side of $b_j$ is a bit state corresponding to the $p^{th}$ transport block.

10. The first communications device according to claim 7, wherein:

M=9, K=8, and c=2; or
M=9, K=8, and c=3; or
M=9, K=8, and c=6; or
M=9, K=8, and c=7; or
M=5, K=4, and c=2; or
M=5, K=4, and c=3; or
M=5, K=4, and c=6; or
M=5, K=4, and c=7.

\* \* \* \* \*